April 2, 1968  G. GYARMATHY  3,375,665
METHOD AND ARRANGEMENT FOR UTILIZING STEAM
POWER IN STEAM POWER PLANTS
Filed June 23, 1965  16 Sheets-Sheet 1
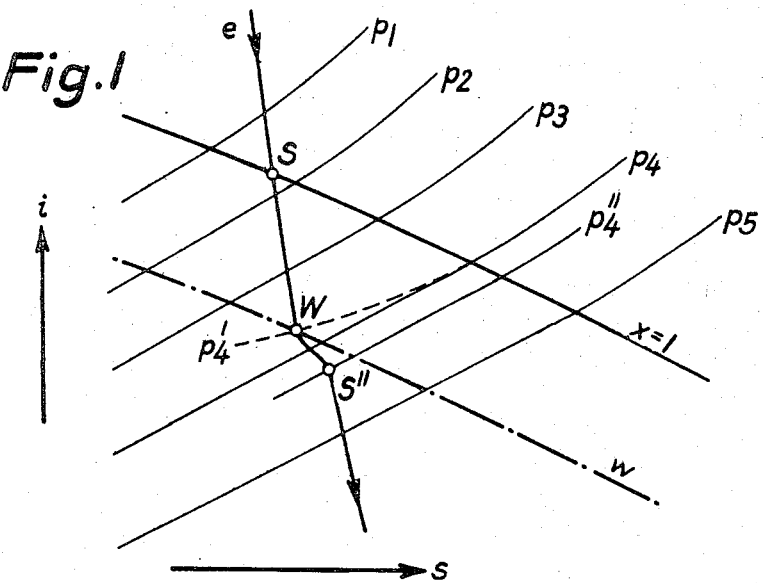
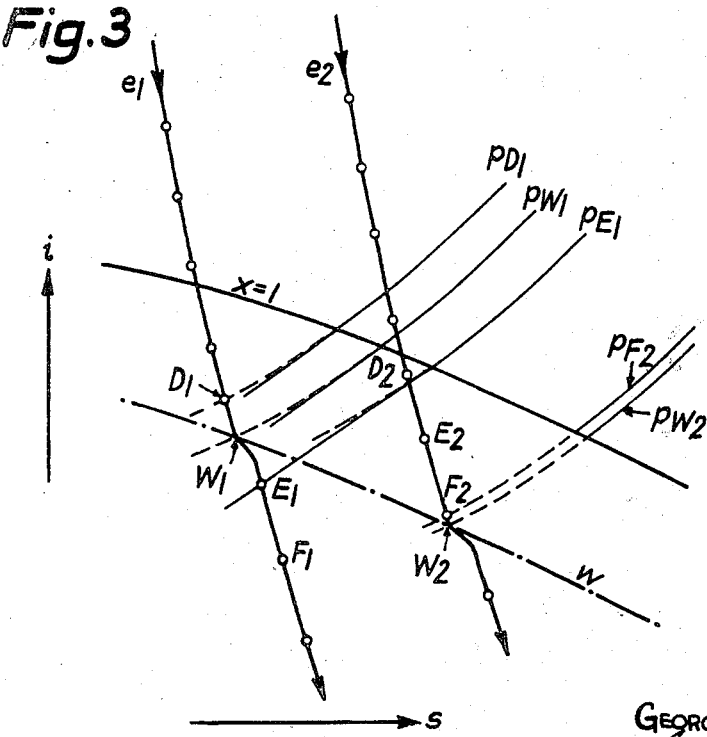
Inventor:
GEORG GYARMATHY
By: Spencer & Kaye
Attorneys

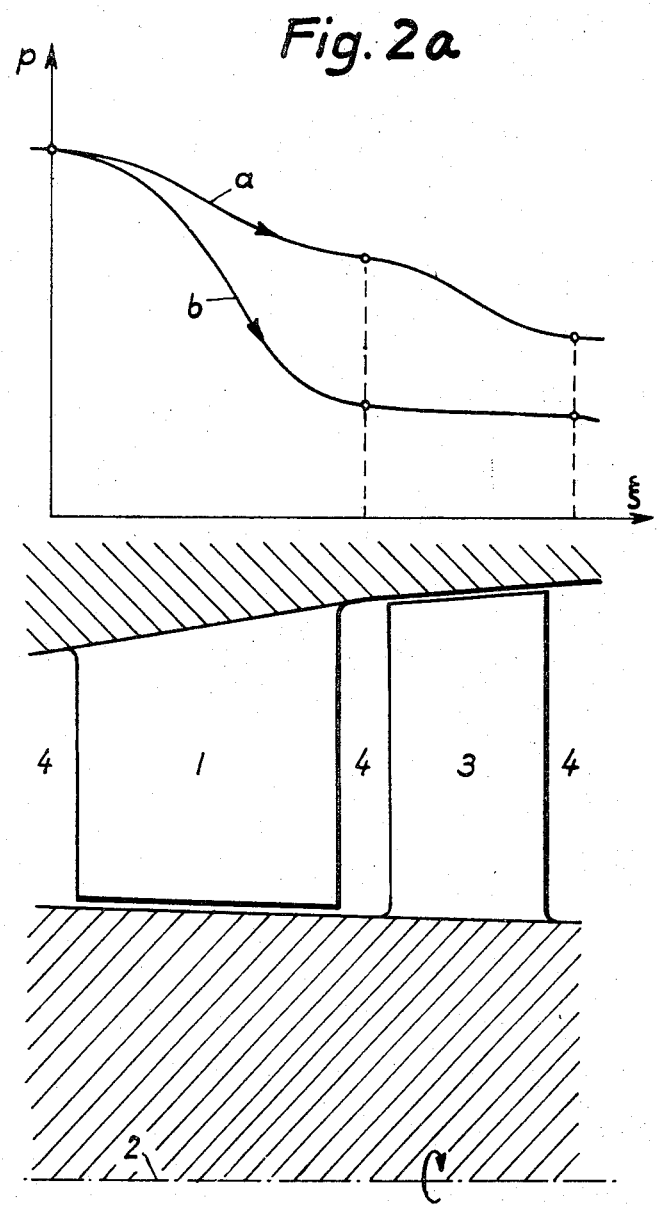

April 2, 1968 G. GYARMATHY 3,375,665
METHOD AND ARRANGEMENT FOR UTILIZING STEAM
POWER IN STEAM POWER PLANTS
Filed June 23, 1965 16 Sheets-Sheet
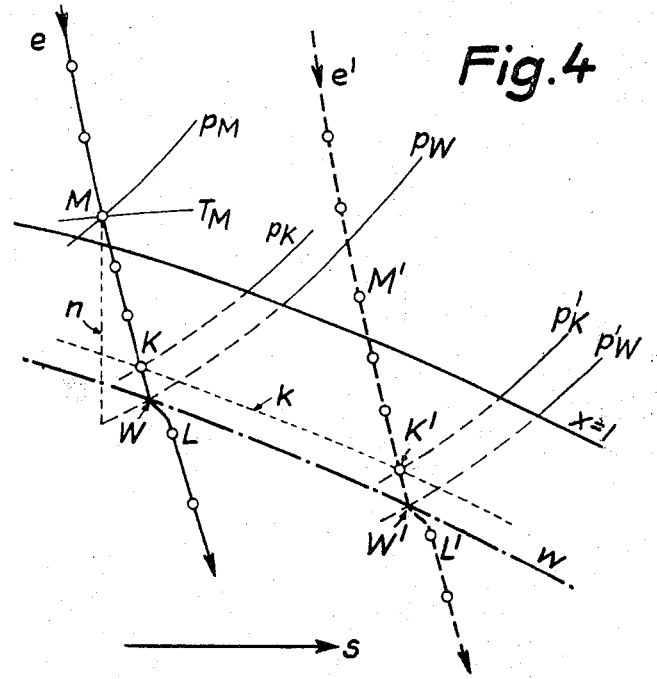
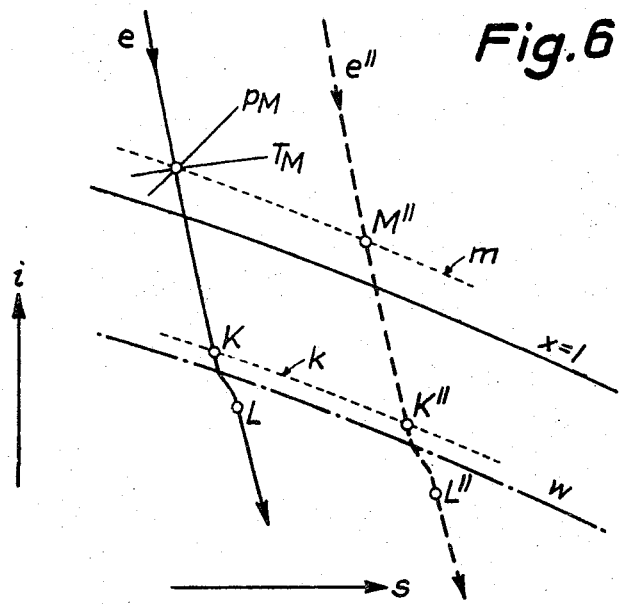
Inventor:
GEORG GYARMATHY
By: Spencer & Kaye
Attorneys April 2, 1968     G. GYARMATHY     3,375,665
METHOD AND ARRANGEMENT FOR UTILIZING STEAM
POWER IN STEAM POWER PLANTS
Filed June 23, 1965     16 Sheets-Sheet 4

Inventor:
GEORG GYARMATHY
By: Spencer & Kaye
Attorneys

April 2, 1968  G. GYARMATHY  3,375,665
METHOD AND ARRANGEMENT FOR UTILIZING STEAM
POWER IN STEAM POWER PLANTS
Filed June 23, 1965  16 Sheets-Sheet Inventor:
GEORG GYARMATHY
By Spencer & Kaye
Attorneys April 2, 1968 G. GYARMATHY 3,375,665
METHOD AND ARRANGEMENT FOR UTILIZING STEAM
POWER IN STEAM POWER PLANTS
Filed June 23, 1965 16 Sheets-Sheet 7

Inventor:
GEORG GYARMATHY
By: Spencer & Kaye
Attorneys

Inventor:
GEORG GYARMATHY
By Spencer & Kaye
Attorneys

April 2, 1968           G. GYARMATHY           3,375,665
METHOD AND ARRANGEMENT FOR UTILIZING STEAM
POWER IN STEAM POWER PLANTS
Filed June 23, 1965           16 Sheets-Sheet 11
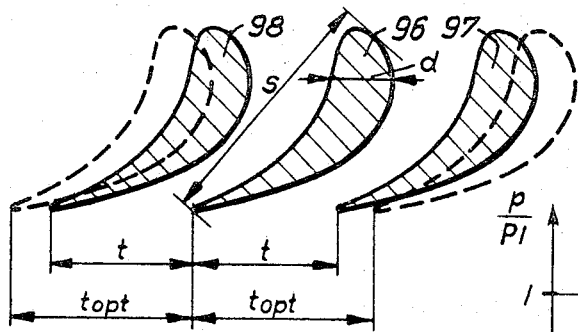
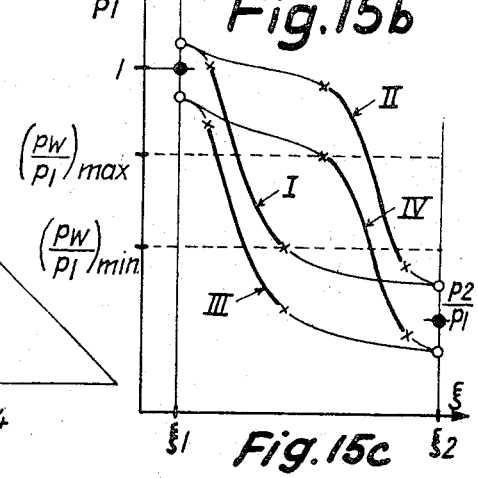
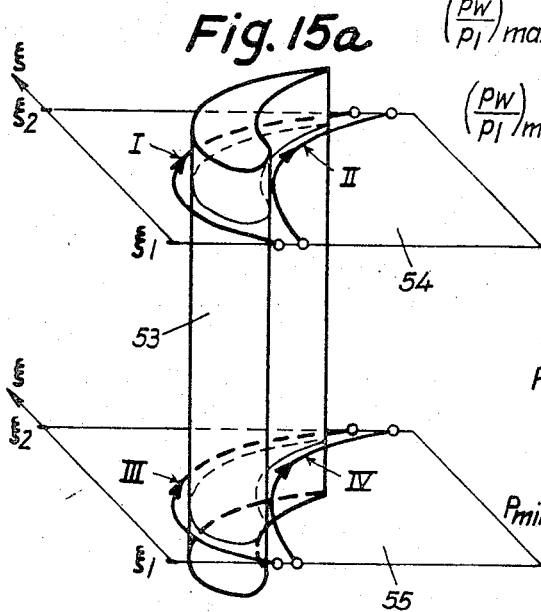
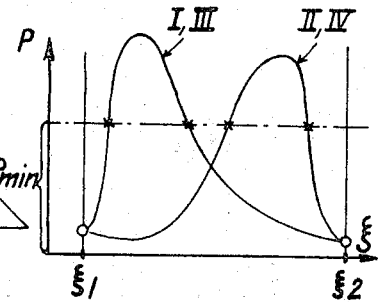
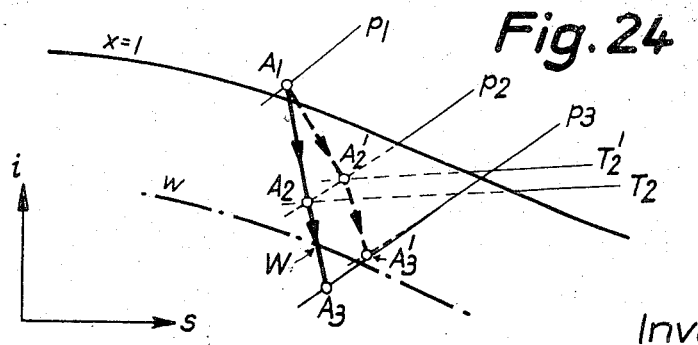
Inventor:
GEORG GYARMATHY
By Spencer & Kaye
Attorneys

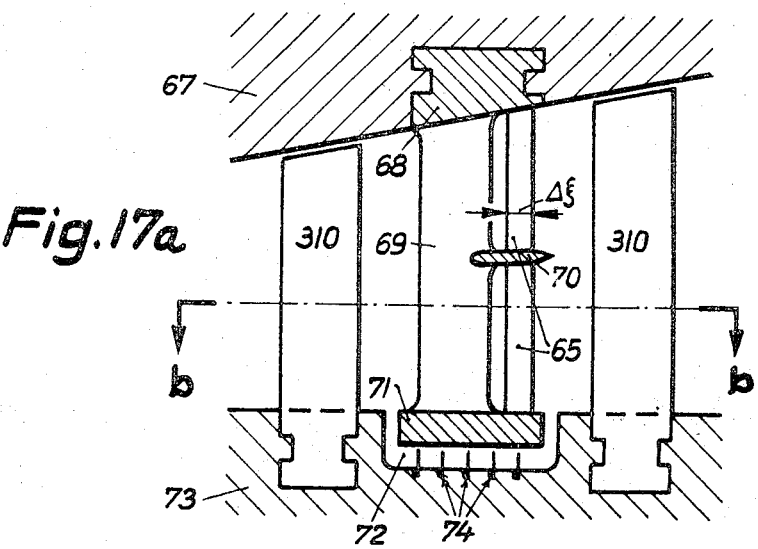
Fig. 17a
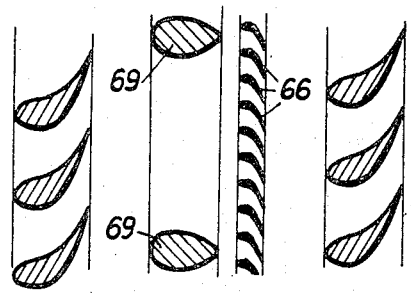
Fig. 17b
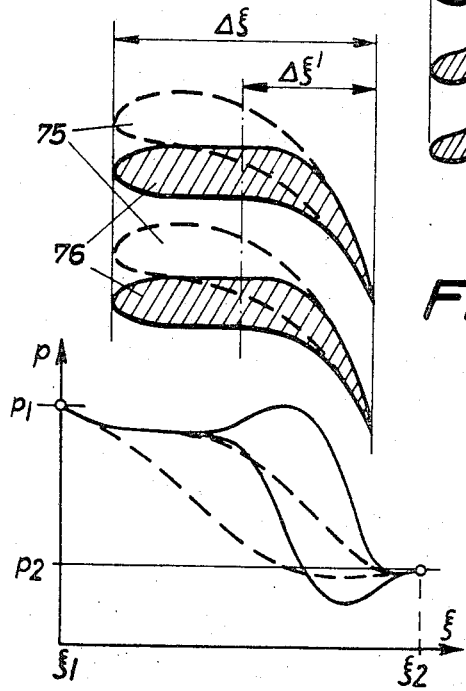
Fig. 18a
Fig. 18b
Inventor:
GEORG GYARMATHY
By: Spencer & Kaye
Attorneys

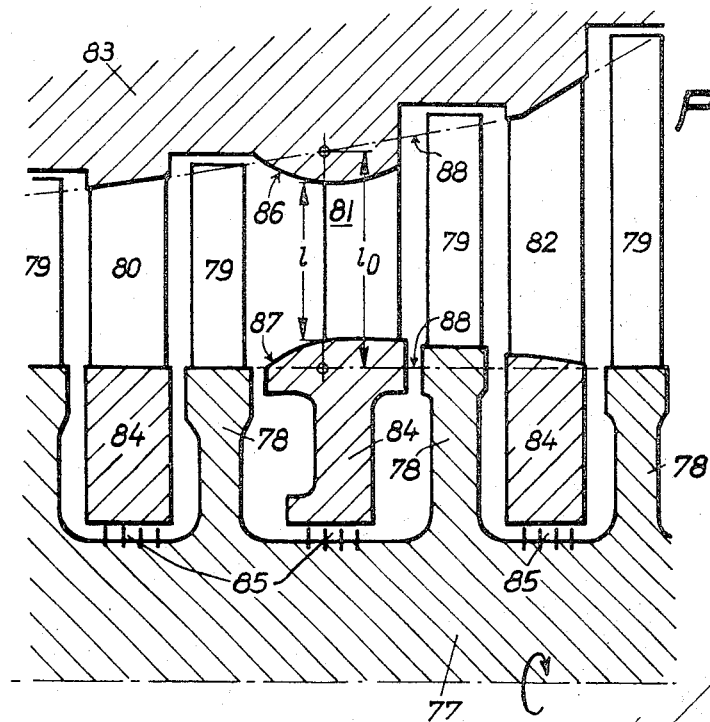
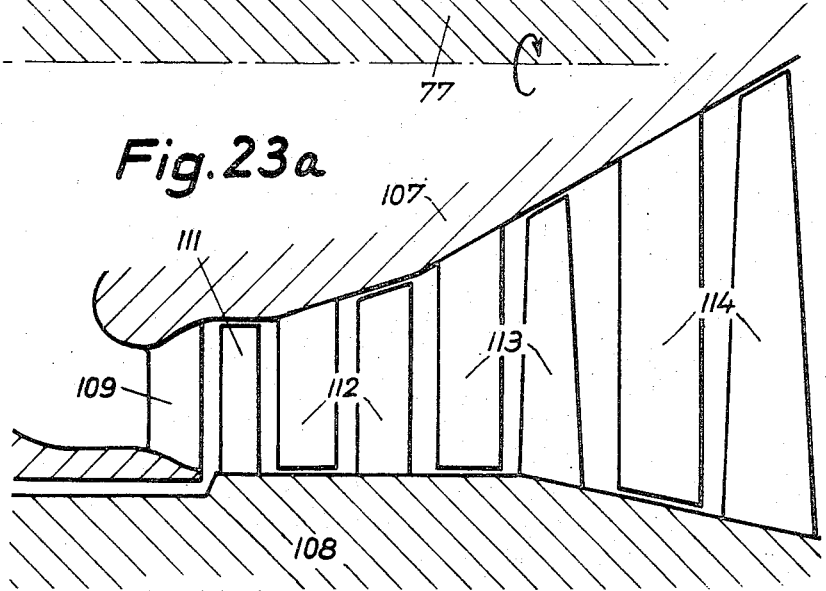
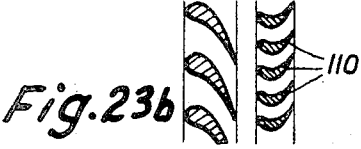

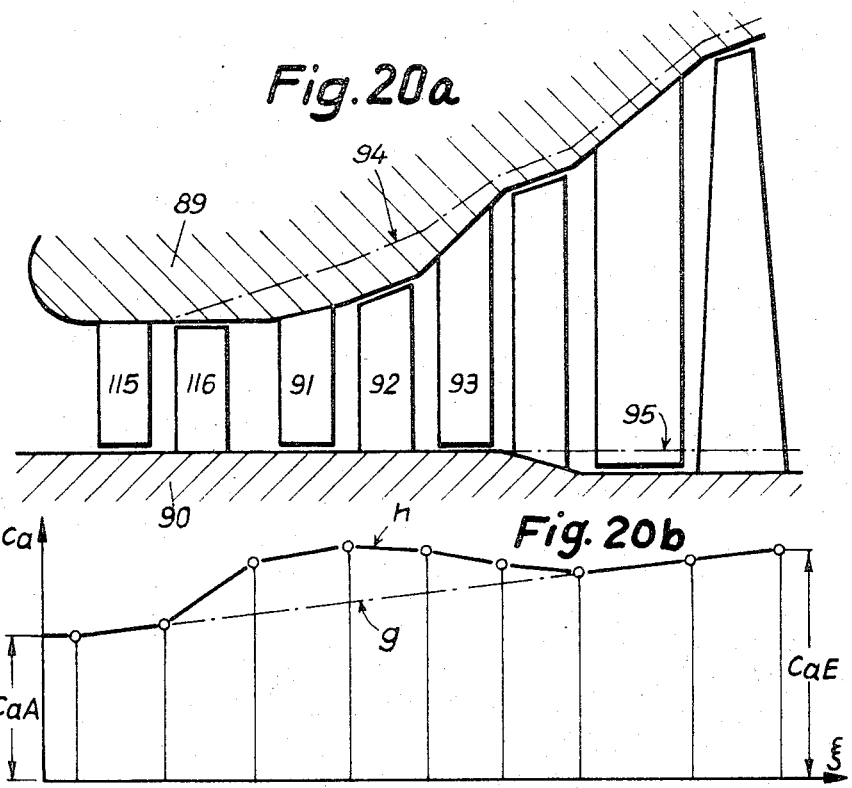
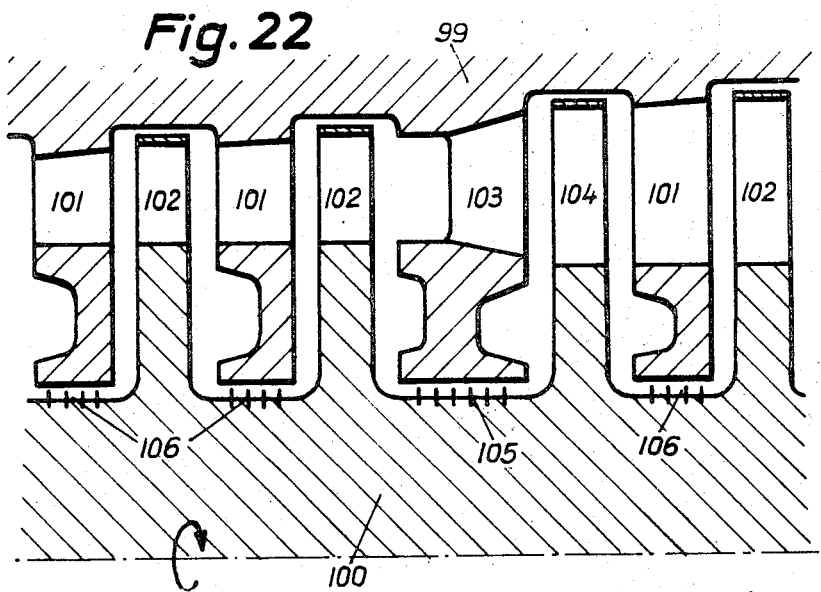

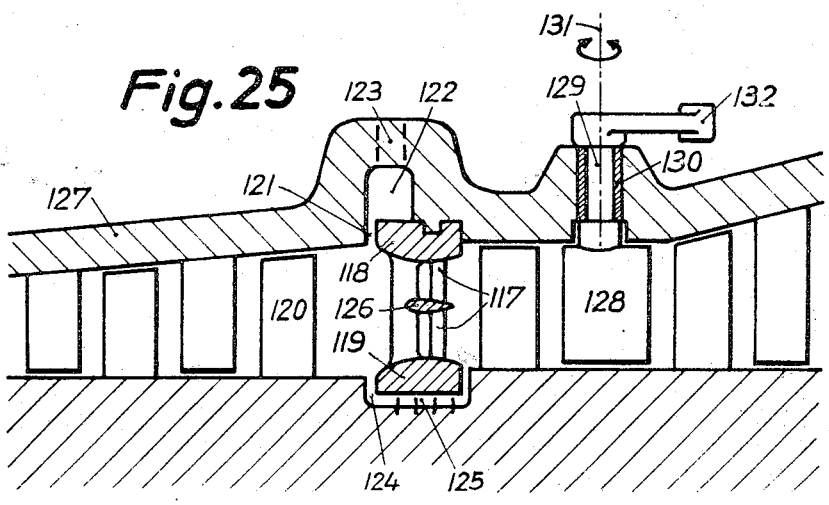
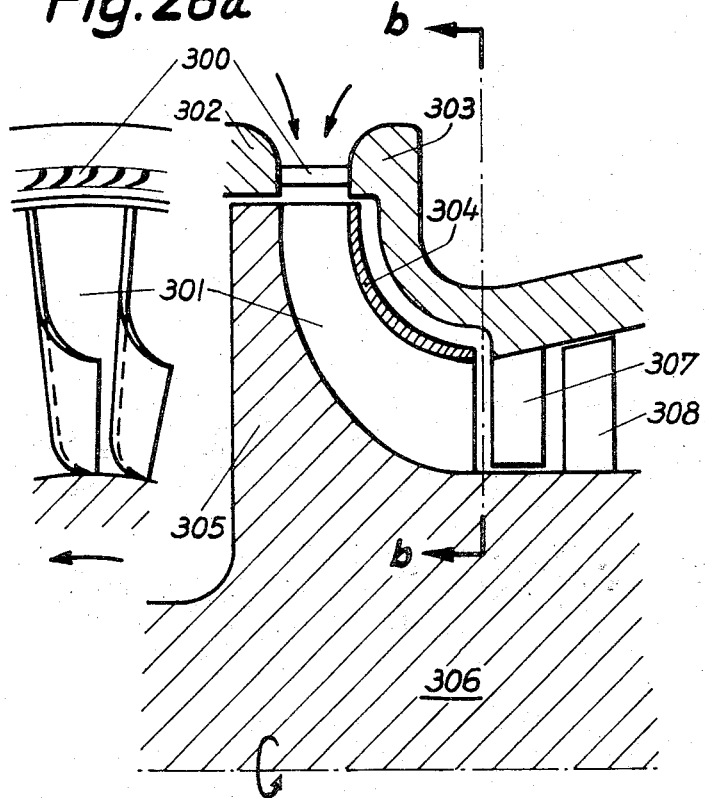

United States Patent Office 3,375,665
Patented Apr. 2, 1968

3,375,665
METHOD AND ARRANGEMENT FOR UTILIZING STEAM POWER IN STEAM POWER PLANTS
Georg Gyarmathy, 35 Hohestrasse,
8702 Zollikon, Switzerland
Filed June 23, 1965, Ser. No. 466,300
Claims priority, application Switzerland, June 24, 1964, 8,287/64
26 Claims. (Cl. 60—105)

ABSTRACT OF THE DISCLOSURE

A method and apparatus for reducing erosion and efficiency losses caused by the appearance of the liquid phase in power generating turbines which use a vapor as the working medium and in which the expansion penetrates the wet-vapor region. Regulating action influences the turbine and specific design features of the turbine to achieve, at least in the important operating stages, a very fine distribution of the liquid forming fog droplets.

---

The present invention relates to a method for operating a steam turbine plant and a device for performing this method, viz, for turbines which expand vaporous media to a pressure so low that in the course of expansion moisture is precipitated. This applies mainly for the conventional condensation turbines working with steam.

It has long been known that the occurrence of moisture within the flowing steam lowers the efficiency of the turbine and causes erosion damage in the blading. The invention aims at reducing such efficiency losses and risk of erosion. For this purpose the invention provides means which ensure that the moisture is always precipitated in finely distributed form, thus remaining harmless.

The method in accordance with the invention is characterized by the fact that one or several properties of the working medium, from which properties the average size of the vapour droplets can be deduced, are measured while the turbine is running, and that on the basis of this result at least one regulating action is performed additionally to the load and any other regulation, which action ensures constant high fineness of vapour even with a variable load.

The arrangement or device for performing this method is distinguished by the turbine having detectors connected to a control instrument which processes the measurements signalled by the detectors, the output side of the control instrument being connected to at least one additional regulating member of the plant.

The drawings explain the invention with reference to the physical fundamentals and several exemplary designs.

Figure 5:
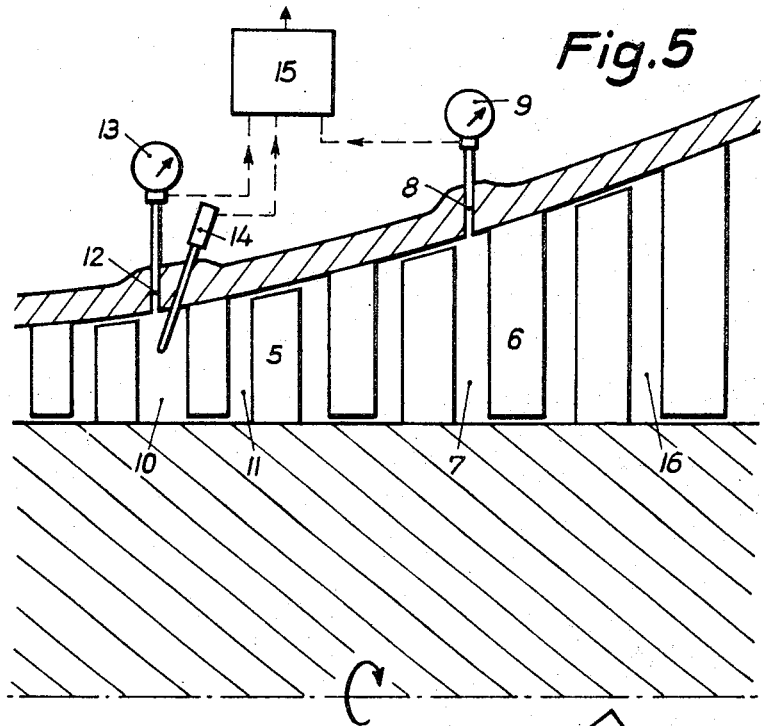
Figure 7:
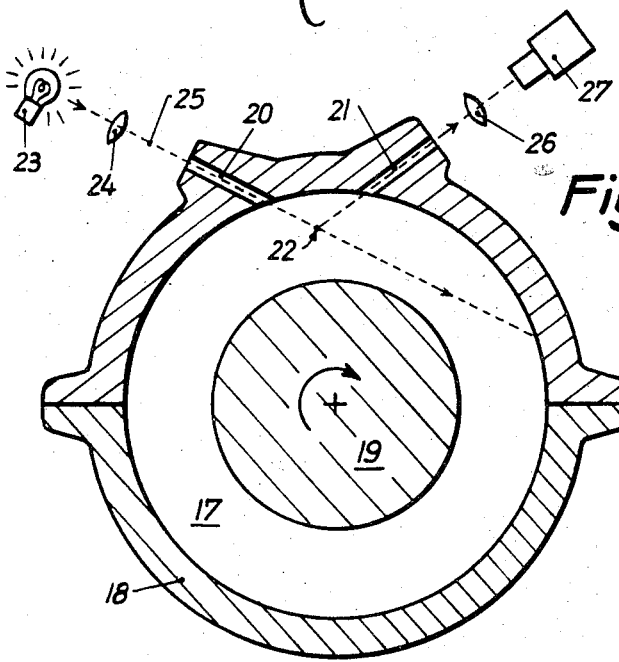
Figure 8:
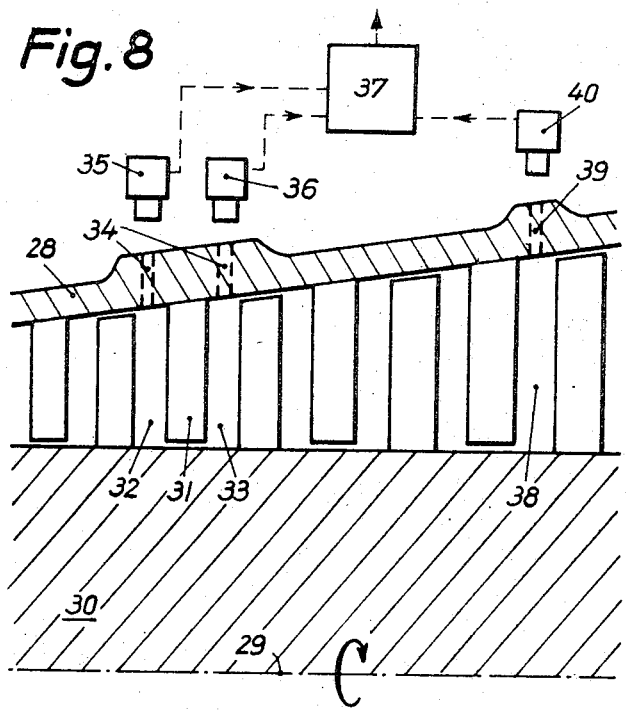
Figure 9:
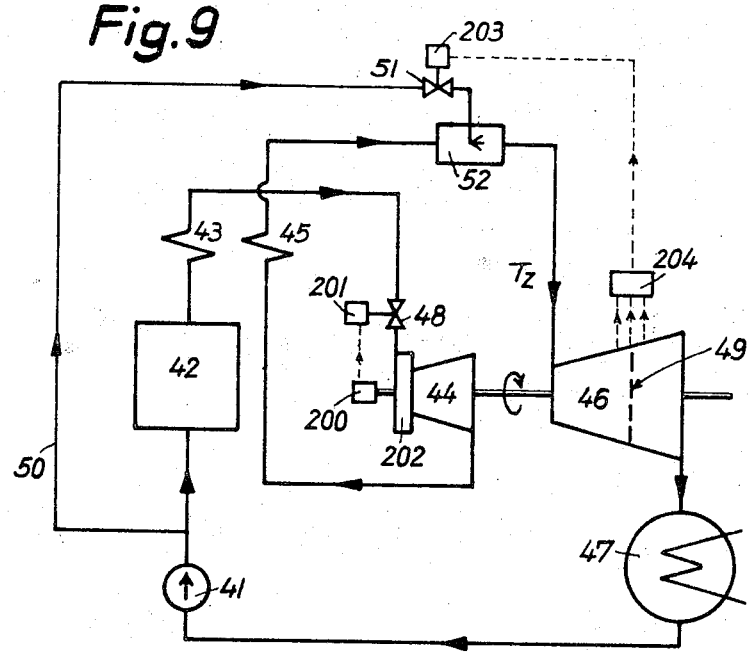
Figure 10:
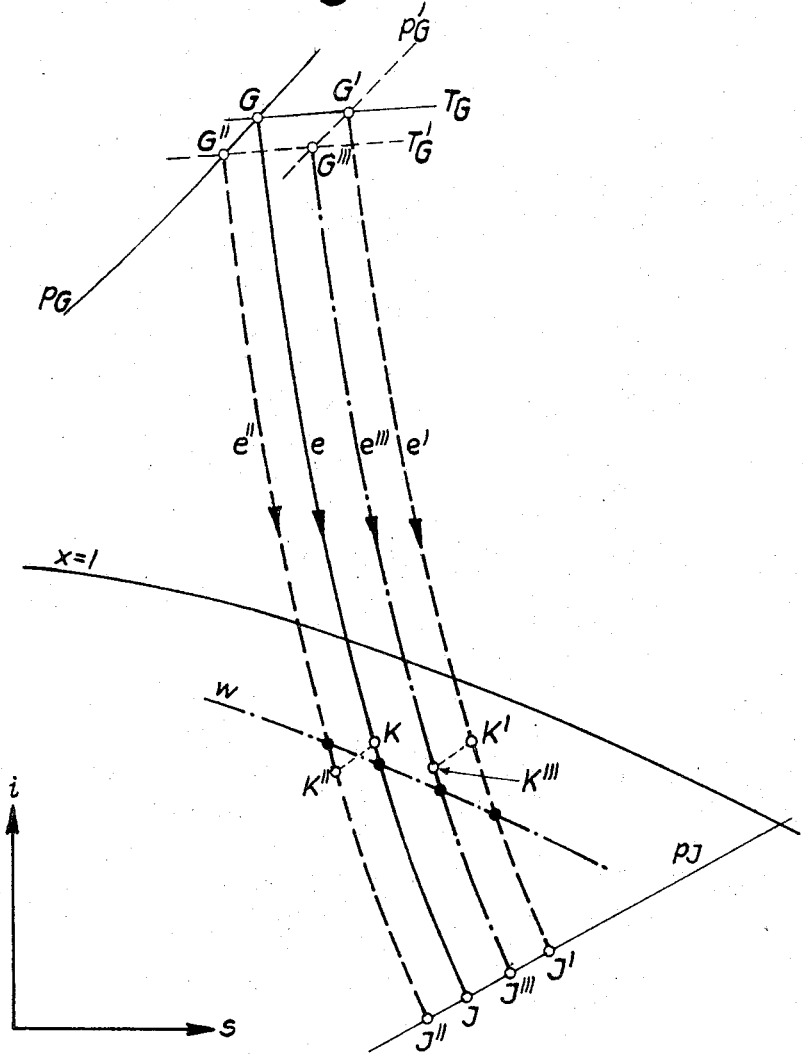
Figure 11:
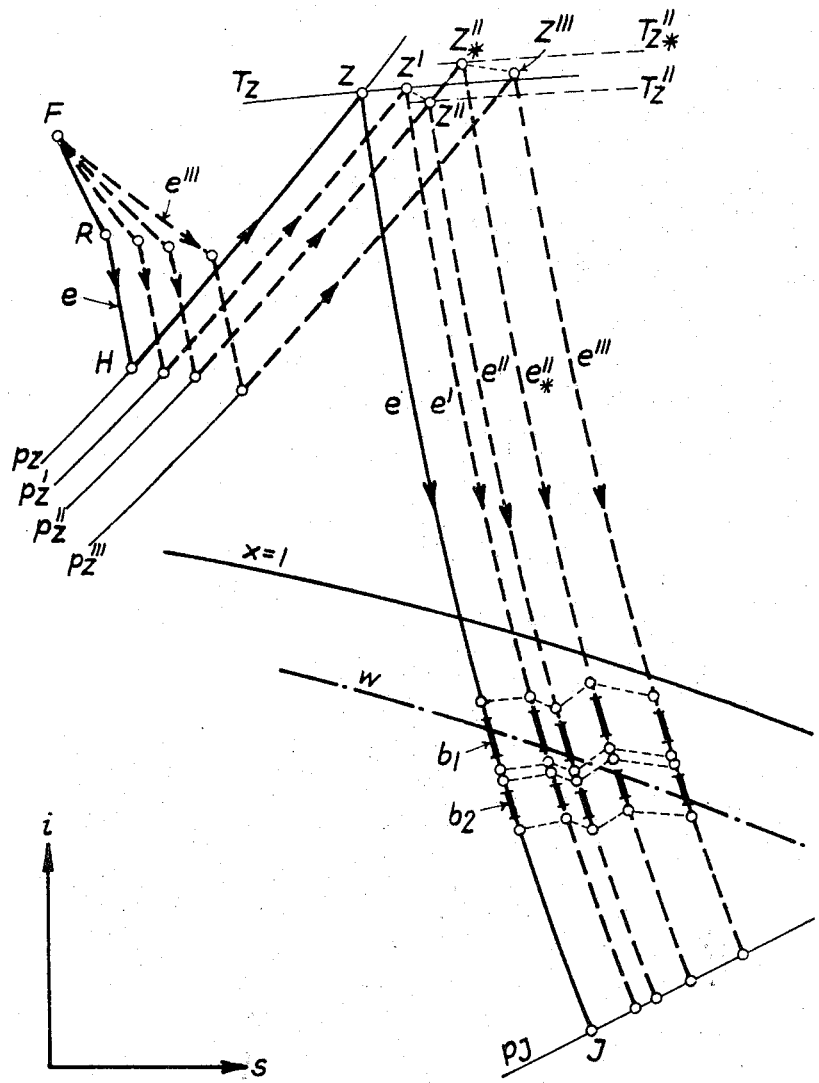
Figure 12A:
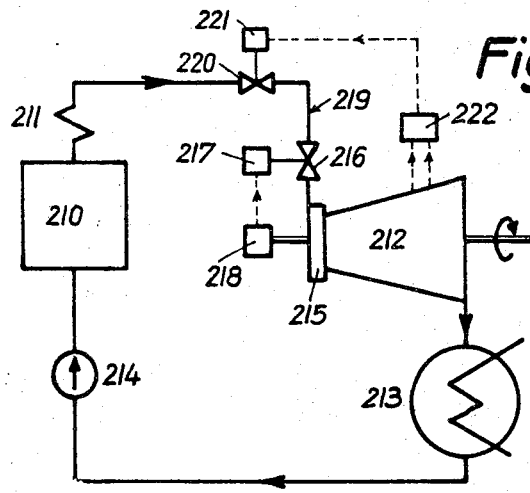
Figure 12B:
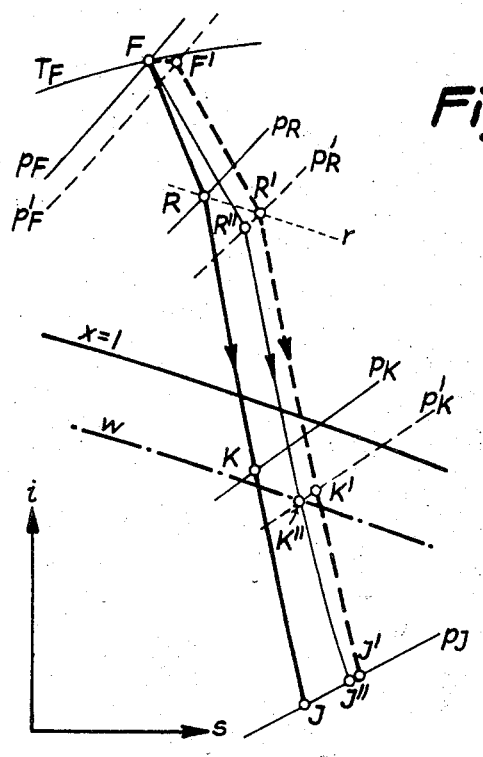
Figure 13A:
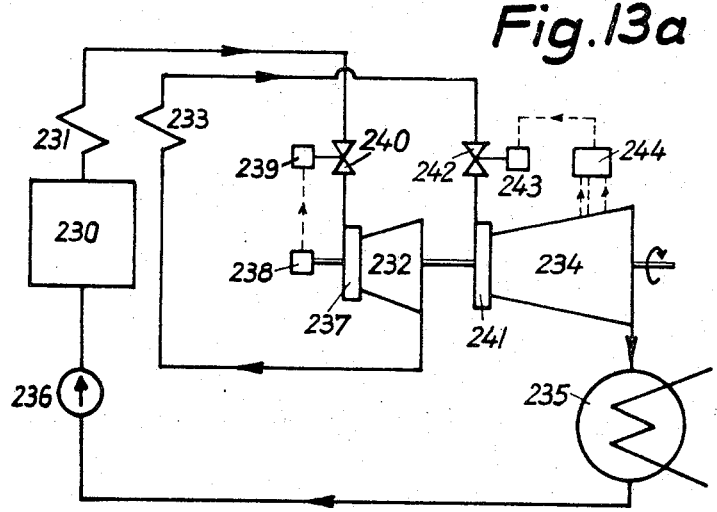
Figure 13B:
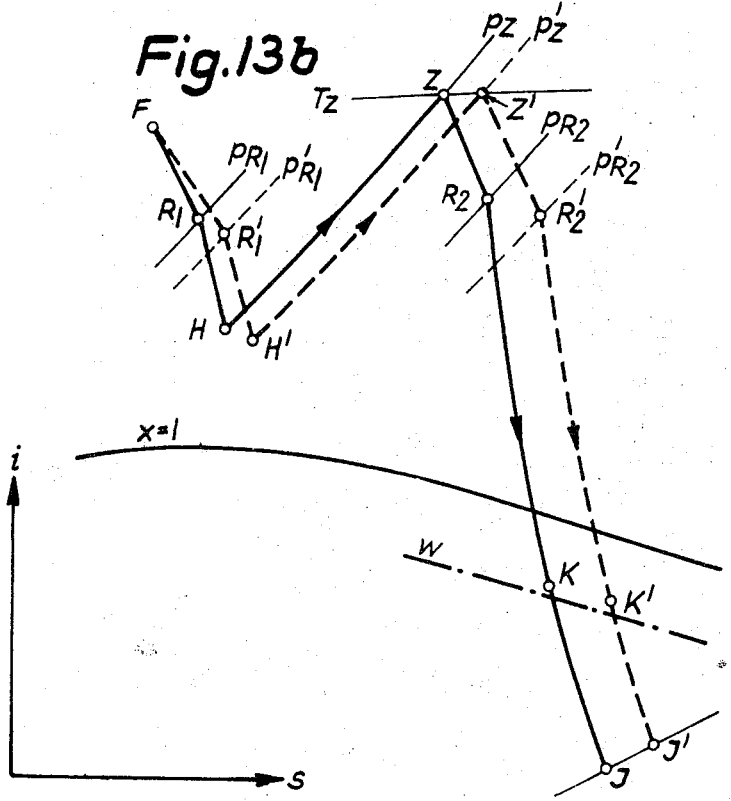
Figure 14A:
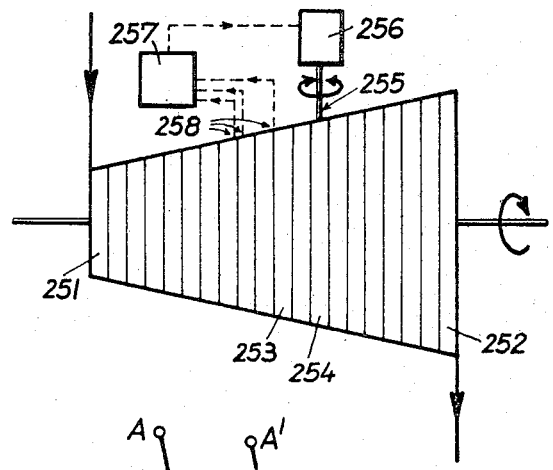
Figure 14B:
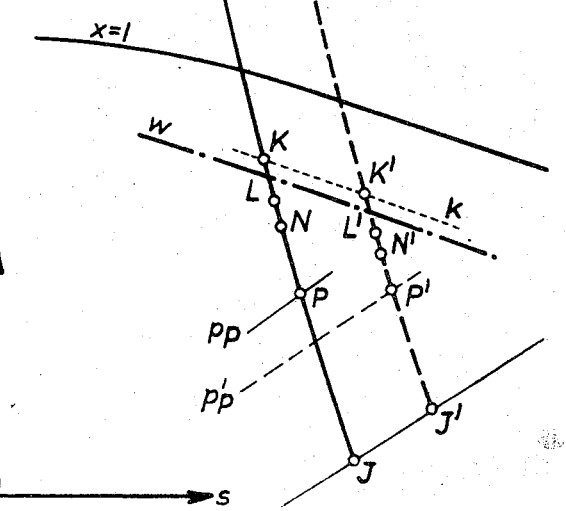

FIG. 1 shows enthalpy-entropy diagram, explaining formation of vapour,

FIGS. 2a and 2b are, respectively, a graph of the pressure-lowering in a turbine stage, and a showing of a turbine stage, FIG. 3, enthalpy-entropy diagram, explaining condition curve in a conventional turbine, FIG. 4, enthalpy-entropy diagram, explaining condition curve in a turbine regulated in accordance with the invention, FIG. 5, example for the arrangement of detectors in a turbine, FIG. 6, enthalpy-entropy diagram, explaining one possibility for simplifying the arrangements, FIG. 7, sketch of principle for arrangement of the devices for optical observation, FIG. 8, example of the arrangement of optical detectors on a turbine, FIG. 9, wiring diagram for one exemplary design with input temperature regulation, FIG. 10, enthalpy-entropy diagram, explaining the action of the temperature regulation, FIG. 11, enthalpy-entropy diagram for FIG. 9, FIGS. 12a and 12b are, respectively, wiring diagram and condition curve for an exemplary design with input pressure regulation, FIGS. 13a and 13b are, respectively, wiring diagram and condition curve for an exemplary design with second regulating stage, FIGS. 14a and 14b are, respectively, sketch of principle and condition curve for an exemplary design with adjustable guide wheel, FIGS. 15a, 15b and 15c are, respectively, a showing of a blade and steam lines therefor, a static pressure curve, and a curve of local speed of pressure loss, FIGS. 16a and 17a and 16b and 17b are, respectively, exemplary designs for narrow condensation wheels, and sections taken along line b—b showing the blade profiles, FIGS. 18a and 18b are, respectively, suddenly deflecting blade profiles as exemplary design for a condensation wheel, and a pressure curve for such wheel, FIG. 19, exemplary design for a condensation wheel with enhanced flow speed, FIGS. 20a and 20b are, respectively, exemplary design for several condensation wheels with enhanced flow speed, and a speed curve for such wheel, FIG. 21, blade arrangement in a condensation wheel with narrow spacing, FIG. 22 and FIGS. 23a and 23b are, respectively, exemplary design for condensation wheels with enhanced pressure gradient, and blade profiles of the wheel of FIGURES 23a, FIG. 24, explanation of non-steady disturbance of vaporisation, FIG. 25, exemplary design with condensation wheel and adjustable guide wheel for regulation, FIGS. 26a and 26b are, respectively, exemplary design with radially flow-impinged condensation wheel, and a view of the blade profiles of such wheel.

It has long been observed that the precipitation of moisture inside the expanded steam does not start exactly at the condition of the steam in which it would be expected in accordance with the known thermodynamic properties of steam. FIG. 1 represents a portion of the expansion process in the known $i, s$ diagram. The ordinate is enthalpy $i$, the abscissa entropy $s$; the curves marked $p_1, p_2 \ldots$ are lines of equal pressure, which in this diagram correspond to the behaviour of the relevant steam.

The line marked $x=1$ is the saturated steam curve. For the steam-moisture mixture, $x$ represents the proportion of steam and $x=1$ therefore means that along this curve, as also in the region above it, the steam contains no moisture. The greater the distance below this curve, the more moisture the steam contains, i.e. $x$ declines accordingly.

Referring to line $e$, which represents the condition curve during expansion in a turbine, this line crosses at point S (saturation point) the limiting curve, and it would therefore be expected that under further expansion more moisture would precipitate. Observation teaches, however, that at first this does not happen, but that below point S the steam under the very rapid expansion in a turbine passes without precipitation of moisture through unstable states, which in thermodynamics are known as undercooled conditions or states. If a certain line $w$ is overstepped, which is designated as the "Wilson line," this undercooling collapses, precipitation of moisture occurs almost instantaneously and the steam returns to the usual stable condition. The point of perceptible starting of this spontaneous condensation is marked W, the point of state after this is marked S". The pressure line, which corresponds approximately to the pressure $p_4$ for the undercooled steam, does not coincide with the line which is valid for the thermodynamic equilibrium. It is drawn as a broken line $p'_4$. After the spontaneous condensation a rather lower pressure prevails, marked $p''_4$.

The liquid precipitation on spontaneous condensation is in the form of small droplets evenly distributed in the steam (vaporization). The term "vaporization," as used throughout the instant specification and claims, is intended to mean spontaneous condensation of the steam. The vapour can be observed by suitable means (e.g. optical, due to the light scattering effect of the droplets) from the point of vaporization onward in the steam flow.

In the conditions arising in steam turbines, the Wilson line lies approximately at the point where at thermodynamic equilibrium about 3% moisture would be present, that is approximately at the line $x=0.97$. In precise terms, its exact position still slightly depends on the speed at which the state of the steam approaches it (i.e., speed of expansion). For greater expansion speeds the Wilson line lies lower in the wet steam region than for smaller speeds. In the following exposition the Wilson line will for the sake of simplicity be regarded as a fixed line.

The point of intersection of the particular curve indicating the prevailing state and the Wilson line is referred to as the "Wilson point," the appropriate condition "Wilson state," the appropriate pressure "Wilson pressure." For example, in FIG. 1 point W is the Wilson point and pressure $p_4$ the Wilson pressure for the condition curve $e$.

Now for the present invention the following two new discoveries are of fundamental importance: first, theoretical investigation of spontaneous condensation (the theory of nucleus formation) shows that the fineness of the vapour, i.e. the mean size of droplets formed, depends on how rapidly pressure loss occurs immediately before the start of condensation. The more rapid the pressure loss, the smaller and more numerous the droplets become, i.e. the finer the vapour. Second, theoretical calculations on flow processes in wet steam turbines show that the fineness of the vapour exerts an influence on the efficiency of the steam moisture component and on the erosive action of the steam moisture. The finer the vapour, the better the efficiency, and the less the risk of blade erosion.

Now as is known the pressure in the successive blade wheels of a turbine does not drop equally everywhere. Rather, the pressure of a flowing steam particle drops stepwise, i.e. now more rapidly, now more slowly. FIG. 2b shows a conventional axial turbine stage, consisting of a guide wheel 1 and a rotor 3 rotating round the axis 2. The upper part of the illustration, FIGURE 2a, shows the curve of the static pressure $p$ along the flow over the axial co-ordinate $\zeta$. The process in accordance with curve $a$ is characteristic for stages in accordance with the the bladeless axial spaces 4 no or only slight pressure losses occur. In contradistinction, rapid pressure loss occurs in the interior of the blade wheels, i.e. in the flow channels between the blades. The rotors of impulse stages are, however, an exception in that the pressure herein remains almost constant, as in the axial spaces. The expression "suitable blade wheel" (i.e. a blade wheel suitable for the production of a fine vapour) includes the guide wheels of the impulse stages and the guide wheels and rotors of the reaction stages.

Depending on whether the Wilson state is reached during a rapid or slow pressure loss, either a fine or a coarse vapour emerges. According to the condition curve both cases are possible in a steam turbine. Where there are changes in the operating condition (e.g. of load, condenser pressure, etc.) generally first one, then the other case occurs, whereby in conventional turbines there is no regular pattern. This question is explained in more detail with reference to the enthalpy-entropy diagram of FIG. 3. Lines $e_1$ and $e_2$ represent the condition curve in a group of stages for two different sets of operating conditions of a conventional turbine. For example, $e_1$ is for a larger load and $e_2$ for a smaller load. The circles represent the so called interstice states prevailing in the successive axial spaces. Their distribution on the particular condition curve is the result of the structure of the turbine and the particular operating conditions (such as flow quantity, steam state at inlet, condenser pressure etc.) and is taken as given. Points $D_1$ and $D_2$ refer to the same axial space for the different loads, likewise points $E_1$ and $E_2$ or $F_1$ and $F_2$ etc. Spontaneous condensation occurs once at pressure $p_{W1}$ and again at $p_{W2}$. These pressures are fixed by Wilson points $W_1$ and/or $W_2$, corresponding to the broken curve of the pressure lines for undercooled states. If the distribution of the interstice states on the expansion line $e_1$ is now observed, it is seen that none of these points lies in the immediate vicinity of Wilson point $W_1$, i.e. the pressure $p_{W1}$ is clearly (e.g. by more than 5%) different both from the next higher interstice pressure $p_{D1}$ and from the next lower interstice pressure $p_{E1}$. (In the association of the pressure lines to the interstice state points it should be noted that $D_1$ indicates an undercooled state, but $E_1$ an equilibrium state.) This difference of pressures means, as can be easily seen from FIG. 2a, that the pressure $p_{W1}$ in the interior of a blade wheel is reached during a rapid pressure loss and that thereby a fine vapour emerges. In contradistinction, in the case of expansion in accordance with line $e_2$ it is seen that Wilson point $W_2$ has moved into the immediate vicinity of one of the interstice state points, viz, point $F_2$. Therefore pressure $p_{W2}$ is reached during a slow pressure loss, and coarse vapour emerges.

These conditions are exploited by the invention in order to reduce the efficiency losses and erosion damage in the stages of a steam turbine subject to flow of wet steam, by providing means to ensure the production of a fine vapour. For individual operating conditions, the fineness of the vapour can be achieved automatically (cf. e.g. line $e_1$ in FIG. 3). Such an operating condition can also fortuitously be the operating condition achieved in dimensioning the turbine, if in dimensioning the turbine the stage gradient happens to be distributed along the expansion line so that the Wilson line is reached inside a suitable blade wheel. Where the operating condition is altered, however, the ratios shift in the sense explained by FIG. 3, which generally results in coarsening of the vapour. In many conventionally constructed turbines a fine vapour can never emerge simultaneously at all points of the flow section. Often the vapour does not even approximate of the required high fineness because of the unsuitable dimensioning of the blade wheels.

The aim of the present invention is to enable the production of an optimally fine-droplet vapour and to ensure its occurrence in a wide range of operating conditions in a steam turbine. This range comprises those "important" operating conditions which are used relatively often. The other operating conditions are unimportant both as to the erosion factor and as to deterioration pressure etc.).

For this purpose the invention provides means for monitoring the quality of the vapour while the turbine is running and that on the basis of the result of such monitoring regulating actions can be performed which allow the desired fineness of vapour to be induced and maintained with alteration of the remaining parameters of the operating condition (e.g. load, speed of rotation, extraction pressure etc.).

In order to ensure in the dimensional operating condition of the turbine the fineness of the vapour without regulating actions, the gradient in constructing the turbine is distributed over the individual turbine stages so that the Wilson state is achieved in the interior of a blade wheel. In the dimenisonal operating condition the formation of a fine vapour is thus ensured, provided that the condition curve of the steam corresponds to the calculated prediction of efficiency. In other operating conditions— and also in the dimensional operating condition, if the actual condition curve fails to agree sufficiently with the calculation—the condition curve in the turbine is influenced by suitable regulating actions so that the particular Wilson state is always achieved at the desired point of the turbine, i.e. in the interior of a suitable blade wheel. This blade wheel can always be the same one, or for various areas of operating condition, a different one. In the latter case, coarse vapour forms temporarily during the transition from one running condition area to the next, but occurs only briefly and is therefore allowable.

In the following description, first the fundamentals of regulation are described, then the manner of the regulating actions and lastly some measures concerning the design of the turbine wheels which can enhance the effectiveness of the regulation.

The basis for the regulation provided in accordance with the invention is the monitoring of the vapour or vaporization while the turbine is running. The monitoring can be either continuous or intermittent and can consist in direct observation of a definite property of the vapour or in a definition of the point where the Wilson state is achieved.

First the procedure is explained in accordance with this latter alternative. FIG. 4 shows the condition curve in the dimensional operating condition of a turbine—line $e$. The circles indicate the interstice states, with K and L as the states respectively before and after the blade wheel in which the spontaneous condensation starts, and M as the last still overheated interstice state. Condensation begins at Wilson point W, corresponding to point of intersection of line $e$ and Wilson line $w$, i.e. in the blade wheel which causes expansion $K \rightarrow L$. The fineness of the vapour is ensured by the expansion $K \rightarrow L$, being selected large enough and pressure $p_K$ differing sufficiently from pressure $p_W$, $p_K$ and $p_W$ being the pressures appropriate to conditions K and W respectively. The position of the start of condensation in relation to this blade wheel and/or in relation to the turbine can be characterized by the value of the ratio $p_K/p_W$. As long as this ratio does not change, vaporization begins at the same place. Even when changes occur in the operating condition, if the turbine is regulated so that the ratio $p_K/p_W$ remains constant, the place where condensation begins and consequently also the fineness of the vapour remain unchanged, and thereby fulfills the aim of the invention. An example of such an operating condition can be shown with reference to the condition curve line $e'$. The interstice states have shifted therewith into the position marked by a prime, e.g. condition K to position K' etc. Condensation starts at the new Wilson point W', at pressure $p'_W$. For the new value of pressure $p_K$ which is designated $p'_K$, the conditions $p'_W = p'_K/p_W$ apply in accordance with the above remarks, whereby the right side of the equation is fixed by the dimensional layout. As shown in the enthalpy-entropy diagram, this means that the interstice state point K is in the event of change in the operating condition shifted along a line $k$ parallel to the Wilson line.

In the practical performance of such regulation, however, the difficulty arises that pressure $p_W$ cannot be measured directly within reasonable technical expenditure. In accordance with the invention this difficulty is overcome as follows: pressure $p_W$ is not measured directly, but indirectly defined on the basis of an overheated, therefore easily measured condition point and of the—at least approximately known—interior efficiency of the turbine. For this purpose two condition magnitudes of the steam are measured at a place where the steam is still overheated (e.g. in interstice state M in FIG. 4). These condition magnitudes can be themselves optional, provided that their values can be measured exactly. For this latter reason pressure (as static or total pressure) and temperature measurements are suitable. For the following it is assumed that the static pressure and the temperature are measured, cf. pressure line $p_M$ and temperature line $T_M$ in FIG. 4. This means that this steam condition and thus a point on the condition line $e$, which lies near the Wilson line, are unequivocally known. Furthermore, the incline of condition line $e$ to the isentrope $n$ proceeding from point M is given by the interior efficiency of the turbine, the condition curve in this area of the $i, s$ diagram is known and thus also the Wilson point, i.e. also the Wilson pressure $p_W$. This design can be carried out in advance for a given turbine for all occurring positions of condition point M. On this basis an instrument can be built in a manner known to the art of regulation, which instrument automatically ascertains from the measured data of condition M the pressure $p_W$, relates it to the likewise measured pressure $p_K$ and thus defines the magnitude sought, $p_K/p_W$. Any contingent divergence of the magnitude $p_K/p_W$ from a fixed value determined by the dimensional layout will then serve as a control quantity for the intended regulation, the turbine being regulated until this divergence is nulled.

Two demands must be placed on condition M. First, there must be enough overheating (e.g. greater than 3° C.) to enable the condition to be reliably measured; and second, the overheating must not be so great (e.g. for water vapour not greater than 70° C. approximately) that the determination of pressure $p_W$ is burdened with great uncertainty factors because of the not quite exactly known or constant interior efficiency.

As an example of the arrangement of the devices on a turbine regulated in this manner is shown in FIG. 5, which shows a partial section of the turbine. The steam flows through the turbine in the direction of increasing blade lengths. The saturated steam condition is to be reached in blade wheel 5, and in blade wheel 6 the Wilson condition. Vaporization begins therefore in blade wheel 6. The pressure in axial space 7, which corresponds to the pressure $p_K$ in FIG. 4, is measured by means of a measuring aperture 8 and a pressure sensing device 9 and is then converted into a (e.g. electric or hydraulic) value appropriate to the regulation system selected. To determine pressure $p_W$ the steam condition must in accordance with the above explanation be determined at a place where overheating still prevails, e.g. in axial space 10. Actually axial space 11, where the steam is still overheated, could also be used for this purpose; but this axial space lies before a rotor, where the steam has a great absolute speed, so that the space is less suitable for exact determination of the condition than axial space 10. The pressure measured in space 10 then corresponds to pressure $p_M$ in FIG. 4 and the measured temperature to temperature $T_M$. They are measured by means of pressure measuring aperture 12 and pressure sensing device 13 and by means of temperature sensing device 14. These measured values are also converted into magnitudes appropriate to the type of regulation selected. The data measured by sensing devices 9, 13 and 14 are fed to a control instrument 15 only schematically represented in FIG. 5, which instrument in a manner known to the art of regulating, forms from the three input values a value corresponding to the pressure ratio $p_K/p_W$. This new value is then used by the regulation as a control quantity.

When it is desired to ensure the fineness even in operating conditions widely diverging from the dimensioning without taking excessive regulating action, the procedure may be as follows: in operating conditions which lie near to the dimensional layout the beginning of vaporization will be retained in the same blade wheel as in the dimensional layout; in the other operating conditions regulation is performed so that vaporization again begins in the interior of a suitable blade wheel, although a different one. For practical performance of such a regulation the pressure must then be measured in one or several further axial spaces (e.g. in space 16 in FIG. 5), and the control instrument 15 must determine from a predetermined operating condition instead of the pressure in axial space 7 the pressure measured in this axial space as pressure $p_K$. The additional devices necessary for this type of regulation have not been illustrated in FIG. 5 for the sake of simplicity.

The arrangements are simplified in the event that the pressure gradient of the stages in which expansion takes place from the saturated steam curve to the Wilson line is constant for all operating conditions to be considered, or can be given as an unequivocal function of the pressure at which the saturated steam curve is overstepped.

The theoretical fundamentals of this simplification are shown in FIG. 6. The expansion in the turbine should run in the dimensional operating condition in accordance with line $e$, in another operating condition in accordance with line $e''$. The position of these condition curves can, since they are parallel, be unequivocally described, e.g. through their point of intersection with the saturated steam curve, i.e. through the pressure at which this point is reached. On lines $e$ and $e''$ only three interstice condition points were drawn, for the sake of simplicity, viz, point M and M'' for the place where in accordance with the invention an overheated steam condition is measured, further points K and K'' and L and L'' for the axial spaces before and behind the blade wheel in which vaporization starts. If the gradient of the stages which expand from M to K is known for every position of the condition curve, the position of point M can then be unequivocally determined for every position of point K. As point K in the interest of constant fineness of vapour may only move along a line $k$ running parallel to the Wilson line $w$, the permissible place for point M is a line $m$, which runs approximately parallel to the saturated steam curve. It is then the task of the regulation to retain point M on line $m$. This also results in a simplification of the devices. In the example in accordance with FIG. 5 pressure sensing device 9 and the appropriate measuring aperture 8 would be eliminated and the regulation could be made solely on the basis of sensing devices 13 and 14, which determine condition M. Also the control instrument would then be constructed correspondingly more simply: it would e.g. convert the measured temperature into a pressure value defined by line $m$, compare this pressure value with the measured pressure and effectuate appropriate regulating measures in the event of a divergence.

Naturally even in this simplified case regulation can be performed so that spontaneous condensation does not occur in the same blade wheel in all operating conditions of interest. In FIG. 6 that would mean that line $m$ would be suddenly displaced from a certain position of the condition curve, e.g. in a position higher by a definite amount of gradient. This would be expressed constructionally in an appropriate design of the control instrument.

The following method is presented on the basis of a direct observation of the vapour. In this method, the known fact was exploited that certain properties of vapour (e.g. its permeability to rays or the indication of a thermometer immersed in the steam flow or certain electric properties such as dielectric strength) are different from those of dry steam and perhaps even depend on the average size of the vapour droplets. In particular, the variation of permeability of vapour to electromagnetic radiation (light, infrared rays etc.) can be utilized for practical purposes.

The regulation on the basis of observation of light diffusion in vapour serves as an example to explain the method.

For every wave length of electromagnetic radiation there is a range of vapour droplet size in which the diffusion coefficient of vapour (i.e. the ratio of the intensities of the ray deflected in a certain lateral direction and of the original ray) strongly increases in function of droplet size. In dry steam, however, no light diffusion occurs. By adjusting the wave length of the radiation used to the droplet sizes expected, it can be shown that a change of the average vapour droplet size is related to a great change in the diffusive properties. This favourable wave length falls, in relation to the droplet sizes occuring in steam turbines, approximately in the range of visible light.

The arrangement for the use of light radiation for observing the vapour in a steam turbine is shown in the example in FIG. 7. This represents a section through a bladeless axial space 17 of the turbine. This is delimited on the outside by the housing 18, inside by the rotator 19 and in the direction vertical to the section by two successive blade wheels. In the plane of the axial space there are provided in the housing wall two holes 20 and 21 whose axes intersect at a point 22 in the axial space. Through hole 20 a focused light ray 25 is directed into the interior of the turbine from a light source 23 and a lens system 24. If the steam is already infiltrated with vapour droplets when passing through this axial space, the light ray will be diffused, and the intensity of the diffused light can be measured through hole 21 with the aid of a suitable lens system 26 and a light-sensitive cell 27. A suitable arrangement of the two holes ensures that only diffused light, and not that reflected on the walls, can enter the cell. In the absence of vapour the cell thus does not respond at all.

On this basis it can be ascertained at one or several places in the turbine (e.g. in several axial spaces) whether vapour is present in the steam, and if so, how fine or coarse the droplets are.

The principle of the use of this method in the regulation of vaporization in a steam turbine in accordance with the invention is shown in the example given in FIG. 8. This represents a portion of the longitudinal section through a steam turbine, with the housing 28 and the rotator 30 revolving round the axis 29. The purpose of the regulation is to induce vaporization in blade wheel 31. After this blade wheel the steam is therefore, where the turbine is running correctly, infiltrated with vapour droplets, whereas before it was dry, but mostly undercooled. Axial spaces 32 and 33, i.e. before and after this blade wheel, are each provided with a device for observing the vapour, approximately in accordance with FIG. 7, which is indicated by holes 34 and the light sensitive cells 35 and 36. Where the turbine is running correctly cell 35 detects no vapour, only cell 36 does. The cells are connected to a control instrument 37, which in the event of incorrect running of the turbine, i.e. where neither of the cells or both simultaneously indicate vapour, causes in a known manner regulating actions to be performed.

It is, however, possible with this arrangement that the desired fineness of the vapour is not achieved even when the cells give the desired indication. This is the case when the spontaneous condensation starts in axial space 32, immediately before blade wheel 31, at a place where the pressure loss is still comparatively slow. In this case, the vapour will be coarser than if the spontaneous condensation did not begin until blade wheel 31. To eliminate such unfavourable events a device for observing the vapour is also installed in an axial space 38 lying further back, represented by holes 39 and cell 40, by which the fineness of the vapour is monitored. The measured result of cell 40 is also transmitted to control instrument 37. Even in the event of the desired indication by cells 35 and 36 the control instrument will then continue to initiate regulating actions until cell 40 indicates a sufficiently fine vapour.

This latter arrangement, which gives immediate information about the quality of the vapour, can also be used alone, whereby the measured result is e.g. indicated and the regulation performed by hand on the basis of this indication. Or else this arrangement can also be used together with devices for determining the place of vaporization on the basis of measurement of condition values as first described and used for precision regulation or for control.

Appropriate extension of the device shown in FIG. 8 also enables vaporization to be retained in various blade wheels under various operating conditions. Then appropriate arrangements would be provided besides in the two axial spaces before and after blade wheel 31 also in the axial spaces before and after every blade wheel appropriate for vaporization, and control instrument 37 would be automatically connected with a different pair of these cells according to the range of operating condition.

Examples are given in the following to describe the regulating actions through which the aim of the invention can be achieved. The individual regulating actions are themselves already known in turbine construction, and they have already been applied for other regulating problems (such as load, speed or e.g. extraction pressure regulating). However, it is novel that such regulating actions, additionally to the regulating actions which are necessary for load or other regulating, are performed to regulate vaporization, and that this additional regulating action is controlled by the result of observation of the vapour.

An effective and exact regulation of vaporization in practice often encounters the difficulty that the steam temperature at the turbine inlet cannot be regulated accurately enough with the aid of regulation of the heater alone (boiler regulating, reactor regulating) and that thus the expansion line in the enthalpy-entropy diagram is not always the same even under constant load. This applies particularly for turbines fed with superheated steam. The pressure curve in the turbine depends as is known essentially only on the load (i.e. on flow rate). The temperature curve, however, is determined in the first place by the input temperature (i.e. fresh steam or intermediate superheating temperature). If this fluctuates, the steam temperatures fluctuate at all places in the turbine, and the place where vaporisation begins travels up and down the turbine. If these fluctuations are impermissibly high the fineness of the vapour cannot be permanently maintained.

Regulating the heater does not in most cases allow sufficiently accurate maintenance of a set fresh steam or intermediate superheating temperature. From the standpoint of load regulation that is not a material disadvantage and is mostly tolerated, because the influence of temperature fluctuations on the turbine's output is slight and can be easily compensated. In contradistinction, the regulation of vaporization requires optimum elimination of such temperature fluctuations. Independently of boiler regulation this can be achieved by overheating the steam in the boiler to a somewhat excessive temperature (e.g. about 10 to 20° C. excess) and then cooling it exactly to the desired temperature by admixture of cooler steam or fluid phase (feed water). By dosing the admixture the desired temperature can be maintained exactly (e.g. to ±1° C.).

FIG. 9 shows as an example the diagram of a steam turbine group with single intermediate superheating. The installations immaterial in the present context (e.g. feed water preheater, electric generator, etc.) have been omitted, as also in the subsequent illustrations. The medium is fed by the feed water pump 41 under high pressure into the vaporizer (boiler, nuclear reactor or the like) 42, superheated in the superheater 43 and from there fed to the high pressure turbine 44, where expansion and corresponding cooling takes place as a consequence of the energy output. Afterwards the steam is again brought to a high temperature in the intermediate superheater 45, then expanded in the low pressure turbine 46 to the condenser pressure and next liquefied in condenser 47. Load regulation is performed e.g. with the aid of a speed impulse transmitter 200, which influences servomotor 201 of valve 48, thus regulating the fresh steam current. Valve 48 is used e.g. to indicate in simplified form the jet group valves of regulating stage 202. Vaporization occurs in low pressure turbine 46, the place being indicated by a broken line 49. The task of the exact temperature regulation consists in this case in maintaining $T_Z$, the steam temperature at the input of the low pressure turbine 46 at a desired level, this temperature being important for the condition curve in the wet steam portion. Regulation should be accomplished e.g. by injection of water. As additional arrangements a high pressure water pipe 50, a valve 51 adjustable with the aid of servomotor 203 and a mixing chamber 52 are also required. This latter arrangement can also be constructed as part of the steam pipe. If the water injection described is to serve merely for the accurate maintenance of a prescribed, fixed, intermediate superheating temperature, servomotor 203 will be controlled from temperature $T_Z$. But often it is simultaneously aimed at a regulation of vaporization. In this case servomotor 203, as illustrated in FIG. 9, is controlled by a control instrument 204, which can be identical with control instrument 15 or 37 in FIG. 5 and FIG. 8 respectively. The regulation then works so that e.g. in the event of vaporization starting too far back (i.e. temperature $T_Z$ is too high for some reason, e.g. through overfiring in the boiler) valve 51 is opened further, that is the water injection is increased.

A similar arrangement as in FIG. 9 arises where instead of water cooler steam is admixed with the hot steam. In place of water pipe 50 there is then a steam pipe which diverts part of the steam current after output from high pressure turbine 44 but before input into the intermediate superheater 45, and feeds it to mixing chamber 52.

After this reference to the importance of exact maintenance of the desired input temperature, the actual regulating of vaporization accompanied by change of load will now be described. The regulating action in question will in principle be any action which can cause the start of vaporization to be shifted in the turbine and will not be utilized for another regulating task (such as load, speed or extraction pressure regulation).

*Input temperature adjustment.*—Especially in cases where for the purpose of accurate setting of the steam temperature at the turbine input special arrangements have in any case to be made, e.g. with reference to FIG. 9, vaporization accompanied by change of load can most easily be regulated by adjustment of this temperature. The method of such regulation is explained with reference to FIG. 10. Lines $e$, $e'$, $e''$ and $e'''$ represent the condition curve in four different operating conditions, which occur through corresponding changes in the initial condition (points G to G'''). The case without a prime refers e.g. to full load. The full circles mark the particular Wilson points, corresponding to the point of intersection of the condition curve and Wilson line $w$. Points K to K''' represent the steam condition before the blade wheel in which vaporization begins at full load. The final point of expansion lies at point J, J' and J'' and/or J''', which are determined by the condenser pressure $p_J$—taken as constant for the sake of simplicity. The turbine to which FIG. 10 refers can e.g. be the part of a modern large turbine following the last intermediate superheater, i.e. perhaps the low pressure turbine 46 in FIG. 9. The case of expansion line $e'$ corresponds to a reduction of load at the same initial temperature $T_G$ (smaller flow rate, therefore $p'_G < p_G$). Vaporization shifts in the turbine towards the back, cf. the raised position of point K'. The case of expansion line $e''$ arises when at full load the initial temperature is reduced to a value $T'_G$, and is characterised by a shift forward of vaporization, cf. point K''. The fourth case (expansion line $e'''$) shows that vaporization on reduction of load can be kept in place by a corresponding lowering of the initial temperature (point K''' is in contrast to K' displaced parallel to the Wilson line).

However it is disadvantageous to reduce the initial temperature, having regard to the requirement of good thermic efficiency, such reduction must therefore remain within narrow limits. Increasing the initial temperature is on the other hand limited by the design of the turbine. At full load an increase is mostly not permissible, at small loads (i.e. smaller pressures) on the other hand it is permissible. How the fineness of the vapour can be ensured without impermissibly heavy reduction of initial temperature even in a wider load range will now be explained with the aid of FIG. 11 and the example of the plant shown in FIG. 9 with jet group regulation and single intermediate superheating. The drawn out line tract $e$ shows the expansion curve at full load. Point F is the fresh steam condition (before valve 48). In the regulating stage 202 an expansion F→R occurs, with point R being the so-called "paddlebox condition"; the subsequent expansion R→H falls to the pressure stages of the high pressure turbine 44; after point, there follows the reheating in the intermediate superheater 45 at essentially constant pressure (intermediate superheater pressure $p_Z$). At the output from mixing chamber 52 the steam has temperature $T_Z$ (condition Z). From here on the steam is expanded in the second portion of the turbine (low pressure turbine 46) to condenser pressure $p_J$ (end condition J). Line tracts $e'$ to $e'''$ give the expansion curve at ever diminishing loads. Intermediate superheating pressure $p_Z$ assumes the diminishing values $p'_Z$ to $p'''_Z$, corresponding to the reduction in the flow rate. In the region where Wilson line $w$ is overstepped, four interstice conditions on each of the expansion lines are in FIG. 11 emphasized by circles; the tracts between them indicate the expansion in three successive blade wheels of low pressure turbine 46 (e.g. in the guide wheel and rotor of one stage and guide wheel of the subsequent stage). Those portions of the expansion in these three blade wheels which fall to the inside of the guide wheels, that is which are very rapidly brought about, are drawn in thick lines (tracts $b_1$ and $b_2$). The regulation provided in accordance with the invention now serves to retain the start of vaporization for all interesting loads within one of these tracts.

This is accomplished in this example by regulating the intermediate superheating temperature in the following manner. Due to the fact that the Wilson point can shift within the tract $b_1$ (and also $b_2$) without causing a material coarsening of the vapour, the intermediate superheating temperature $T_Z$ can be left unchanged at loads only slightly different from full load. The extent of this load range is dependent on the particular turbine. Where the $b_1$ wheel is appropriately constructed it is approximately the range between full load and 85% load. The end of this load range (that is about the case of 85% load) is given in FIG. 11 by the point Z' and/or by the expansion curve $e'$. If $T_Z$ were maintained at the same value even at smaller loads, the start of condensation would slip backward out of the $b_1$ wheel. For this reason $T_Z$ is at first lowered so that the intermediate superheating condition shifts on a line approximately parallel to the Wilson line until (at point Z", i.e. expansion line $e''$) a temperature value $T''_Z$ is reached, from where further lowering of temperature begins to be uneconomical. This occurs when the drop of the thermic efficiency begins to be more important than the advantages from the improvement of the turbine efficiency in the wet steam portion and from the elimination of the erosion action. It is now assumed that vaporization is regulated also at smaller loads than those belonging to expansion line $e''$. This is accomplished by a sudden raising of the intermediate superheating temperature to a value $T''_Z{}^*$, which shifts the initial condition to position $Z''^*$ and the expansion line in the low pressure portion to position $e''^*$, with the effect that the beginning of vaporization is pushed over into the $b_2$ wheel, where, however, conditions again are favourable. At further load loss the intermediate superheating temperature is left at $T''_Z{}^*$ or is allowed to drop slightly until at condition $Z'''$ the smallest load the regulation can cover (about half or ⅓ load) is reached.

*Input pressure adjustment.*—Another possibility is to regulate vaporisation by affecting the pressure at the turbine input, insofar as this is not used for load regulation (as in throttle regulated or sliding-pressure regulated machines). However there are types of turbines (e.g. those with intermediate superheating) in which the change of the fresh steam pressure has no effect at all on the condition curve in the low pressure portion. In such turbines this type of regulation can not be used. It is, however, possible to provide this type of regulation e.g. in the conventional turbines fitted with jet group regulation without inermediate superheaing. The diagram of such a plant is shown in FIG. 12a, wherein 210 indicates the boiler, 211 the superheater, 212 the turbine, 213 the condenser and 214 the feed water pump. The load and/or speed regulation is achieved in the usual manner with the aid of a regulator stage 215 having schematically shown jet group valves 216 which are adjusted by servomotor 217, which receives the regulating impulses from the speed impulse transmitter 218. To influence the fresh steam pressure (before the jet group valves 216) for the purpose of regulating vaporization a throttle valve 220 is provided in the fresh steam pipe 219, the servomotor 221 for this valve is controlled by control instrument 222. This produces the regulating impulses, as schematically indicated, on the basis of the observation of vaporization. The method of regulation is clear from FIG. 12b. Here line tract FRJ indicates the condition curve at full load ($p_F$=fresh steam pressure, $p_R$=paddlebox pressure, $p_J$=condenser pressure); the thin line tract FR"J" the condition curve at partial load, if no throttling is performed; the broken line tract FF'R'J' the condition curve at the same partial load, if for regulating the vaporization the fresh steam current is throttled from pressure $p_F$ to $p'_F$, so that the new paddlebox condition R' as against paddlebox condition R is shifted at full load to a line $r$ parallel to the Wilson line. Consequently vaporization occurs at the same place in the turbine as at full load (in the blade wheel before which the condition is indicated by point K, K' or K"), as also the shift K→K' occurs parallel to the Wilson line. (Without throttling, vaporization would at partial load shift forward: condition point K" lies below the Wilson line.) The paddlebox pressure $p'_R$ and the pressure in the back part of the turbine (e.g. pressure $p'_K$) are not changed by the throttling. Throttling itself results in a loss, but this is at least partly cancelled out by the improvement of efficiency in the wet steam portion (expansion K'→J' runs more steeply than K"→J") and because in consequence of the throttling less gradient is worked up in the bad regulating stage and rather more in the better pressure stages. An additional advantage is the elimination of the risk of erosion. It would also be possible to introduce in place of throttling, sliding pressure regulation at constant fresh steam temperature $T_F$, which in a thermic respect would have further advantages of smaller pump output and greater initial enthalpy.

Regulation with the aid of the input pressure has in principle a similar action to that with the aid of the input temperature. This can be understood if in FIG. 12a the portion of the turbine following the regulating stage is regarded as the actual turbine. Then the paddlebox condition is the input condition and the additional regulating action (i.e. the throttling) changes the temperature of this input condition (shift R"→R').

*Section adjustment.*—A further type of regulation, which can be used in all known steam turbines, consists in adjusting a flow section. The practical realization can be achieved e.g. with the aid of jet groups (perhaps as second regulating stage) or by blade adjustment, or by making a virtual section change (e.g. by diverting a variable partial flow to be used in an auxiliary turbine). Two short examples follow showing the action of this regulating method.

FIG. 13a shows the diagram of a turbine with intermediate superheating and jet group load regulation and a second regulating stage for regulating vaporization. The circulation system consists of boiler 230, superheater 231, high pressure turbine 232, intermediate superheater 233, low pressure turbine 234, condenser 235 and feed water pump 236. Vaporization occurs in the low pressure turbine 234. High pressure regulating stage 237 serves for load regulation and is controlled by the speed impulse transmitter 238 by means of servomotor 239 and the schematically represented jet group valves 240. A second, similar, regulating stage 241, fitted with jet group valves 242 and servomotor 243 serves for regulation of vaporization. Servomotor 243 is for this purpose controlled by control instrument 244, which produces the regulating impulses on the basis of the observation of the degree of vaporization. It is to be noted that the regulating stage does not absolutely require jet groups and that the section adjustment can actually also be produced by blade adjustment or indirectly by a bypass valve.

FIG. 13b shows the condition curve of the working medium in the turbine. The designations are: F=fresh steam condition; $R_1$=paddlebox condition after high pressure regulating stage 237; H=condition at output of high pressure turbine 232; Z=condition after intermediate superheater 233 (constant temperature $T_Z$); $R_2$=paddlebox condition after second regulating stage 241; K=last interstice condition before Wilson line $w$; J=end condition before condenser 235. Continuous lines represent full load; broken lines represent partial load and have primes. On reduction of load the pressures after the two regulating stages are in consequence of the smaller flow rate lower by a certain factor ($p'_{R1}/p_{R1}=p'_{R2}/p_{R2}<1$). The position of point $R'_1$ arises from pressure $p'_{R1}$ and the efficiency of the first regulating stage, it is therefore independent of what happens further back in the turbine. The position of point $R'_2$ on pressure line $p'_{R2}$ can on the other hand be influenced with the aid of the second regulating stage by changing the intermediate superheating pressure $p'_Z$ by piling up, thus shifting point Z' along temperature line $T_Z$. In accordance with the prior description a shift of point K parallel to the Wilson line is aimed at, which requires also an approximately parallel shift of point $R_2$. The regulating actions must therefore have the effect that, e.g. where vaporization occurs too far back (where therefore point $R'_2$ lies at a too high temperature), the intermediate superheating pressure $p'_Z$ is increased.

A second example of regulating vaporization by section adjustment is described with reference to the turbine shown schematically in FIG. 14a. To distinguish between the individual blade wheels the turbine is divided into segments. Segment 251 indicates the guide wheel of the first stage, segment 252 the rotor of the last stage. The beginning of vaporization is to be retained in guide wheel 253. The blades of guide wheel 254 of the subsequent stage are made revolvable for the purpose of section adjustment, which is schematically illustrated by the axis of rotation 255 of one of the blades and by servomotor 256, which adjusts the blades. Servomotor 256 is controlled by a control instrument 257, which on the basis of the observation of vaporization which compares the measuring points 258 and produces a regulating impulse. Load regulating means which are not shown in FIG. 14a, determine the flow rate and steam condition at the input (before guide wheel 253) for every load. The action of the regulation of vaporization is shown in the enthalpy-entropy diagram, FIG. 14b. The condition curve is fixed by the input condition (point A for full load, point A' for another load) and by the internal efficiency of the turbine, and ends at points J and J' respectively, which indicate the condition after guide wheel 252. In guide wheel 253, where vaporization is intended to begin, expansion K→L and K'→L' respectively, and in the adjustable guide wheel 254 expansion N→P and N'→P' respectively, occur. The pressure after this guide wheel ($p_P$ and/or $p'_P$) is determined, in practice, solely by the flow rate and on its part determines the position of condition point P and/or P' of the particular condition curve. By adjusting the blades the gradient in guide wheel 254 can be varied over wide limits. This allows point N and correspondingly also points K and L to be shifted on the particular condition curve. In this manner condition point K can in the presence of load changes be kept on a line $k$ parallel to Wilson line $w$ so that the Wilson line is always overstepped in guide wheel 253.

A similar regulation effect is made when the beginning of vaporization is kept within the adjustable guide wheel itself. Then the adjustable blades are flow-impinged by dry steam, which in the matter of design has certain advantages. In contradistinction, the blades must have a favourable form both in relation to adjustment and to vaporization, and this is difficult to achieve. Instead of blade adjustment, of course, the same purpose could be achieved in both cases by virtual cross section adjustment by means of steam diversion.

These last mentioned regulating methods, which provide a cross section adjustment in the wet steam portion, differ in their action from those mentioned earlier. The earlier ones shift the condition curve in the enthalpy-entropy diagram, but leave the stage pressures—at least in the wet steam portion—unchanged. The last mentioned methods on the other hand change just these pressures, the position of the condition curve otherwise remaining the same. Combined use of these two methods can also accomplish the objects of the invention.

In the following, measures of a structural nature are described which can improve the effectiveness of the regulation in accordance with the invention. Such special measures are indispensable in many conventional turbines in order for proper regulation of the vaporization. They are either applied solely to the blade wheel in which the Wilson condition is reached at full load, or also to the blade wheels in which this occurs at partial loads; such blade wheels being designated as "condensation wheels." These measures aim either at improving vapour quality beyond the level possible with the conventional turbine stages or (often at the same time) extending the region in which the Wilson condition can shift under load changes without detriment to the vapour quality. The first effect additionally improves efficiency in the wet steam portion and further suppresses the risk of erosion, the second achieves the aim of the regulation over a given load range with less radical regulating actions, and also widens the operating condition range in which no additional regulating action is necessary. From this both operation and economic advantages arise.

The fineness of the vapour is, as previously mentioned, defined by the speed of pressure loss which the flowing steam undergoes immediately before the Wilson condition is reached. The mean speed of pressure loss in a blade wheel is determined by the value of the relationship $\overline{P}=(c_a/p_1)(p_1-p_2)/\Delta\xi$, where $c_a$ is the axial component of the steam speed (mean value between input and output), $p_1$ and $p_2$ the static pressure at input and output, respectively, of the blade wheel and $\Delta\xi$ the axial wheel width, measured between the front and back edges of the blades. All values relate to the middle circle of the blade wheel. A high value of $\overline{P}$ means a rapid pressure loss and a low value means a slow pressure loss. The values of $\overline{P}$ generally differ, according to the type of blade wheel (gradient, width etc.). From the standpoint of vaporization, e.g., $\overline{P}=200$ sec.$^{-1}$ means a very unfavourable blade wheel, $\overline{P}=2000$ sec.$^{-1}$ a favourable blade wheel. In the interior of the blade wheel, i.e. between the blades, the speed of pressure loss differs from place to place. The local speed of pressure loss is described by the value $P=(c/p)dp/ds$. Here $c$ is the local steam speed, $p$ the local static pressure and $dp$ the pressure loss along the flow way $ds$. The value of P in a blade wheel is greatest between the blades and oversteps $\overline{P}$ often by a factor of two or more whereas before entry into the cascade and immediately after exit, P is generally very small ($P \ll \overline{P}$), to which reference was made in FIG. 2. P also varies between the blades, both along the flow channel and also transverse to it. The vapour will only have the necessary fineness at all points of the flow section when the Wilson condition is reached at all stream lines during a sufficiently rapid pressure drop.

In other words, the Wilson condition should be reached, if possible, at all stream lines at points where P is greater than a permissible minimum value $P_{min}$. The value of $P_{min}$ is determined by the desired fineness of the vapour; in practical cases it will probably always be set above 1000 sec.$^{-1}$ and sometimes even above 5000 sec.$^{-1}$.

The conditions present within a blade wheel are shown in FIG. 15. FIGURE 15a represents a blade 53, through which two section planes 54 and 55 are passed; the first lies at the outside blade end, near the casing wall, and the second at the inside blade end, near the hub. At each plane two stream lines I to IV are indicated; I and III run near the suction side, II and IV near the pressure side of the blade. For the conditions at the other stream lines in the blade wheel these four stream lines represents extreme examples. $\xi$ is the axial co-ordinate, with the values $\xi_1$ and $\xi_2$ for the axial space middle before and after the wheel respectively. FIG. 15b reproduces the curve of static pressure $p$ which is well known for cascades at the four stream lines over the axial co-ordinate. The pressure curves bear the same designations I to IV as the stream lines to which they belong. The pressures are related to $p_1$, the input pressure in the middle circle. The full circles designate the input or output conditions in the middle circle of the blade wheel. In the planes 54 and 55 input and output conditions exist diverging somewhat from the conditions in the middle circle, which is connected with the variation of the flow conditions in radial direction (i.e. along the blade). This also results in pressure curves I and III and/or II and IV being slightly shifted in relation to each other.

If in addition to the pressure curves, also the speed distributions along these stream lines are known, the value of P can be given at all points of the stream lines. It will show approximately the curve indicated in FIG. 15c. High values of P are reached at the suction side (curves I and III) immediately after input, corresponding to the steep pressure drop in this region; at the pressure side (curves II and IV) the same occurs only further back. On the basis of the P curves the region can be given at every stream line in which P reaches or oversteps the requisite minimum value $P_{min}$. At the pressure curves of FIGURE 15b, these tracts are emphasized by thickening of the lines and their edge points marked with crosses. Now the demand for a universally sufficiently fine vapour is obviously only fulfilled when the Wilson pressure is penetrated by all four pressure curves in their thickened tract. From this follows for the Wilson pressure $p_W$ the condition that it must be smaller than $p_W = p_1 \cdot (p_W/p_1)_{max}$ but larger than $p_W = p_1 \cdot (p_W/p_1)_{min}$; $p_1$ being dependent on the load. The value of the bracket values, whose importance is shown by FIG. 15, is essentially independent of load for a given blade wheel.

From the standpoint of vaporization a blade wheel's properties are the more favourable the more rapidly the pressure falls in it (high value of $\overline{P}$) and the wider the pressure range is in which the Wilson pressure can shift (great value of $(p_W/p_1)_{max} - (p_W/p_1)_{min}$). This range is referred to below briefly as "permissible pressure range." In these two respects a blade wheel can be improved by various structural changes, of which a few are described below. First changes are described which provide for increasing $\overline{P}$, then those which provide for widening the permissible range. The first changes also cause a widening in this range, but mostly only a slight one because the P curves—according to FIG. 15—show the steepest curve just at the edge of the permissible range.

*Refinement of the cascade.*—Where instead of a given cascade a cascade is used consisting of geometrically similar but smaller profiles and correspondingly smaller spacing, pressure gradient, speeds etc. remain the same, only the cascade dimensions, including $\Delta\xi$, diminish. Thus $\overline{P}$ of the finer blade wheel becomes greater e.g., at least twice as large as that of another blade wheel or comparison wheel. As examples of such improved turbine stages FIGURES 16 and 17 are given.

Figure 16A:
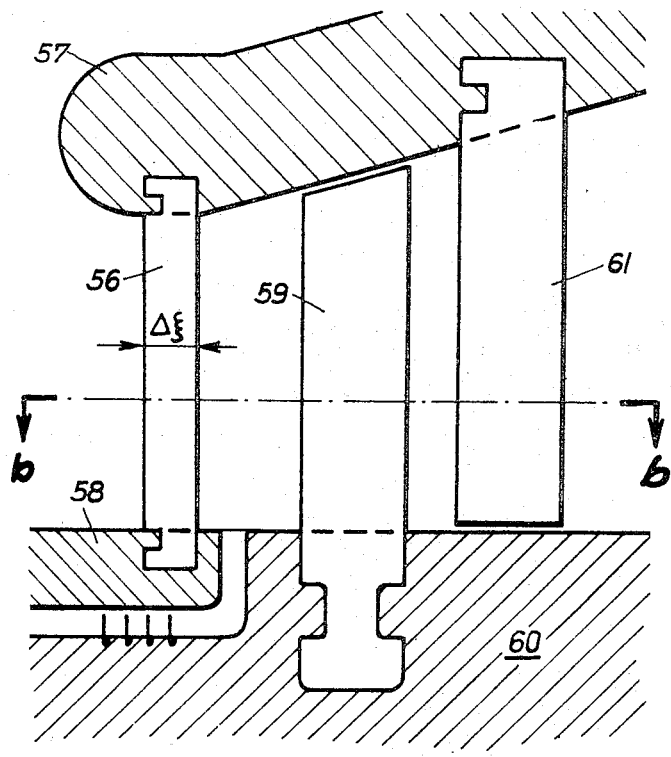
Figure 16B:
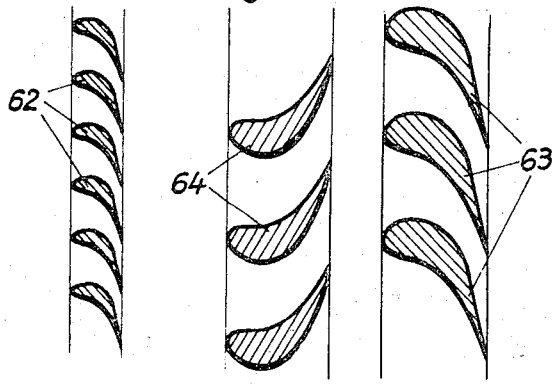

FIG. 16a represents a portion of a turbine in which the Wilson condition is reached at full load in the first blade wheel 56 of a turbine housing. For example, only this blade wheel is to be specially shaped. The blades of this wheel are fastened at their outer edge in the housing portion 57, and at their inner edge in a ring 58 which itself is also fastened to the housing. The subsequent rotor 59 is fastened to rotator 60 and the next guide wheel 61 as also the others to housing portion 57. Blade wheel 56 has a smaller axial width $\Delta\xi$ than the other blade wheels, e.g. the next guide wheel 61. As shown in FIGURE 16b, which is a section taken along line b—b of FIGURE 16a, the blade profiles 62 of blade wheel 56 are geometrically similar reductions of the profiles 63 of the wheel 61. The rotor blade profiles 64 do not differ materially or at all from those of the subsequent rotors. Ring 58 gives the slender blades of blade wheel 56 the necessary mechanical strength.

Another example of the performance of the same improvement measure is shown in FIG. 17a. In this turbine the Wilson condition is reached at full load in blade wheel 65, which is in the midst of a series of conventional blade wheels 310 and, for the purpose of attaining a high $\overline{P}$ value, consists of very fine blade profiles 66 as shown in FIGURE 17b. To fasten such slender blades mechanically correctly, the procedure can be as follows. Instead of fastening the blades themselves in the housing 67, a bearing ring 68 is installed in a groove of the housing (in a divided housing, two half-rings), which ring has spokes 69 at whose middle an intermediate ring 70 is fastened to form two concentric blade rims separated from each other, and, an inside ring 71 being fastened at the inside end of the spokes. This latter ring is accommodated in a hollow portion 72 of shaft 73 and is packed against the shaft by labyrinth strip 74 so that in the gap no appreciable harmful flow-impingement of blade wheel 65 is possible. The blades of wheel 65 are supported on the outside on intermediate ring 70 and inside on inside ring 71. Also, e.g., blade wheel 65 could be assembled from an outside and an inside half, which halves would be held fast between bearing ring 68 and intermediate ring 70 and/or between this and inside ring 71, and over the circumference composed e.g. of several segments. The two blade wheel halves need then not have the same number of blades, i.e. the fan effect occurring in circular cascades could be partly compensated by a greater number of blades in the outside half and may also be provided with differing output angles.

*Sudden deflection of flow.*—The formula given for $\overline{P}$, $\overline{P} = (c_a/p_1)(p_1-p_2)/\Delta\xi$ assumes conventional blade profile shapes, i.e. those shapes in which the deflection of flow begins immediately after the profile nose, such as the profiles 63 and 64 shown in FIG. 16b or the broken profiles 75, shown in FIG. 18a. For profiles which form blade flow channels having a straight long entry portion and an adjoining short curved exit portion for deflecting the flow further back, as e.g. for the profiles 76 in FIG. 18a, there must be inserted in the $\overline{P}$ formula instead of the axial wheel width $\Delta\xi$ the width $\Delta\xi'$ in which the deflection is caused. The front portion of the profiles (of the axial dimension $\Delta\xi - \Delta\xi'$) could be omitted without appreciable influence on the value of $\overline{P}$, as can be seen from the pressure curves of FIG. 18b wherein the line curves apply for profiles 76, and the broken for the conventional profiles 75 with both shapes causing the same pressure conversion $p_1 - p_2$. Blade wheels with profiles of the type of 76 combine the good mechanical strength of the conventional profiles 75 with a high $\overline{P}$ value, which could otherwise only be achieved by slender blades.

*Increasing axial speed $c_a$.*—In accordance with formula $\overline{P} = (c_a/p_1)(p_1-p_2)/\Delta\xi$, $\overline{P}$ is proportional to axial speed $c_a$ of the steam. This can be increased by narrowing the axial flow section with reference to a comparable wheel of conventional design, whereby the pressure conversion can be kept the same by a corresponding enlargement of the output angle. The section narrowing can be caused in the radial direction by shorter blades, or in the circumferential direction by narrower spacing. FIGS. 19 to 21 are exemplary designs for increasing the speed $c_a$.

FIG. 19 shows a partial section of a turbine of the chamber type. The wheel discs 78 are connected with shaft 77 and support the rotor blades 79. The guide wheels 80 to 82 are fixed in the housing 83. Inside they support the walls 84, which are packed against shaft 77 by labyrinth strips 85. Vaporization for the most important running conditions should begin in the guide wheel 81. For the purpose of increasing $\bar{P}$ in this wheel by increasing $c_a$ protruding portions 86 and 97 have been disposed at the outside and inside channel limit, which portions narrow the flow channel and thus increase $c_a$. The blade length in guide wheel 81 is thus $l$ and is smaller than $l_0$, which would be the blade length in conventional design of a comparable guide wheel 81, corresponding to the broken line, straight channel contour 88. After wheel 81 this original channel contour is soon restored.

FIG. 20a shows as a second example, a longitudinal section of a four stage low pressure turbine consisting of housing 89 and drum rotator 90. The stages are dimensioned for 50% reaction. The Wilson condition should be reached at maximum loads in blade wheel 91, and at partial loads in blade wheel 92 or 93. In FIGURE 20b, which shows the curve of $c_a$, the axial speed of the steam in the axial spaces, is drawn over the axial co-ordinate $\xi$. The broken line $g$ shows the curve usual in low pressure turbines (from initial value $c_{aA}$ rising evenly to end value $c_{aE}$), which curve would occur in a channel contour according to the broken lines 94 and 95. The continuous line $h$ shows, on the other hand, the axial speed curve corresponding to the channel contour selected with a view to high $\bar{P}$ values and drawn in a continuous line. Axial speed is increased in the region of blade wheels 91, 92 and 93, because here the meridian channel is constricted and therefore has a height (i.e. blade length) which is smaller than in the conventional design. Further back the channel height again corresponds to the conventional design.

Another way of increasing axial speed in a cascade consists in increasing the number of blades and keeping their shape constant i.e. constant blade thickness $d$, as shown in FIG. 21. FIG. 21 shows a blade profile 96 and its neighbour profiles 97 and 98. The drawing represents an evolution of the cylindrical section in the middle circle of the blade wheel. In broken lines there is shown the position of the adjacent profiles corresponding in the given profile shape to the optimum flow efficiency with $t_{opt}$ as optimum spacing. The position drawn in a continuous line and hatched, corresponds to the increased number of blades, i.e. to a smaller spacing $t$. The chord length $s$, as also the profile shape, is the same in both cases. For example, the blade spacing to chord ratio should be at most 0.9 times as large as that of a comparable wheel of conventional design. The narrowing of the spacing has a further advantage from the standpoint of vaporization, that is, due to the narrowing of the flow channel the pressure curves at suction and pressure sides will coincide better, which allows vaporization to occur under more uniform conditions.

*Increasing pressure drop* $(p_1-p_2)/p_1$.—This action does not increase $\bar{P}$ alone, as the previous actions did, but in general also extends the permissible pressure range $(p_w/p_1)_{max}-(p_w/p_1)_{min}$, which according to the invention is desirable and often even indispensable. However an increase of $(p_1-p_2)/p_1$ does not in all circumstances result in an extension of the permissible pressure range, which can be seen from the following.

A larger pressure drop in the blade wheel results in greater steam speed at the wheel outlet. This may sometimes also exceed the local sonic speed (output Mach number $Ma_2>1$), so that then in the blade channels the sound barrier (i.e. the local Mach number $Ma=1$) is penetrated somewhere. Now the theory of spontaneous condensation states that a flow limited on all sides by fixed walls, like the one between the blades, is greatly disturbed by the sudden occurrence of condensation, when the Wilson condition is reached at a place where there is almost sonic flow, i.e. where $Ma=1$. In certain circumstances condensation can then also cause undesirable vibration. Also in such a disturbed flow the desired fineness of vapour can no longer be maintained. Therefore, the rule results that the Wilson condition must not be reached in the blade channel tract where the Mach number lies betwen about $Ma=0.85$ and $Ma=1.15$. The "permissible" pressure range therefore ceases at these Mach numbers even when the expansion in the range $0.85<Ma<1.15$ actually has the desired speed.

The increasing of pressure drop for the purpose of extending the permissible pressure range is therefore only correct until $Ma_2$, the Mach number at the blade wheel outlet, reaches the value of about 0.85 to 0.95 or for example has a value between 0.70 and 0.95 at maximum load; or else the pressure drop must be so great that $Ma_2$ is considerably above the value 1.15 (e.g. $Ma_2=1.3$ or more). This must always be borne in mind in dimensioning the blade wheels.

Possible structural changes for the purpose of increasing pressure drop are: diminishing the guide wheel and rotor output angles, increasing the axial steam speed or the circumferential speed. Here either the degree of reaction can be reduced and thus the pressure conversion increased only in the guide wheel, or, as the other extreme case, the degree of reaction can remain, so that the pressure conversion rises in the rotor in the same measure as in the guide wheel. The practical performance of these actions depends very greatly on the type of turbine i.e., whether action, reaction, high pressure or low pressure turbine etc. Of the many possibilities the following two are mentioned.

FIG. 22 shows stages of an action or impulse turbine having a housing 99 and a rotator 100. In this example, the Wilson condition is reached in a portion of the turbine where the circumference speed of the rotors and thus in the conventional design of the stages also the stage gradient are comparatively small. In the conventional stages, consisting of guide wheels 101 and rotors 102, the guide wheels here all have approximately the same output Mach number $Ma_2$, e.g. $Ma_2=0.5$, which in the case of water steam means a pressure drop of about 15% per guide wheel, i.e. in these wheels it is $(p_1-p_2)/p_1=0.15$. But the first and last few percent will not be overstepped in the inside of the wheels, that is not quickly enough. As permissible pressure range there remains in these guide wheels at best about 5 to 10 percent. In rotors 102 there is no appreciable pressure drop. If now the Wilson condition is to be retained in a blade wheel of the type of rotors 101, this would at once place very high demands on the accuracy of regulation and immediate regulating action in the event of the least load change. Therefore the stage in which the Wilson condition is reached at full load is dimensioned for a greater pressure gradient, i.e. its guide wheel 103 has smaller output angles in comparison to the guide wheels 101. This guide wheel is e.g. dimensioned so that at its output $Ma_2=0.9$ results. In rotor 104 there is no pressure drop but a stronger deflection of flow than in rotors 102. In the case of the above $Ma_2$ values, guide wheel 103 (again assuming water steam) produces a pressure drop of about $$(p_1-p_2)/p_1=0.45=45\%$$

so that the permissible pressure range has about the width of 30 to 35%, which is a considerable range for the performance of regulation. As in guide wheel 103 a greater pressure drop is effected, i.e. the steam volume increases more than in guide wheel 101, the channel has been widened more than otherwise and the strip number in labyrinth packing 105 has been increased over those in labyrinth packings 106. With specially small stage gradients in the normal portion, i.e. at very small circumferential speeds, it may become necessary to have a Curtis stage instead of a more heavily stressed action stage. The Curtis stage can incidentally also be incorporated in turbines which run with greater circumferential speeds, viz, when a blade wheel is to be incorporated with very high output speed ($Ma_2 \gg 1.15$).

As the second example, the four stage low pressure portion of a reaction turbine is shown in FIG. 23a, with housing 107 and rotator 108. The Wilson condition is reached in guide wheel 109 of the first stage. To extend the permissible pressure range in this wheel, this stage is deigned as an action stage, which as shown in FIG. 23b the blade profiles 110 of rotor 111 deflect more strongly than the blades of the other stages 112 to 114.

*Blade torsion.*—Suitable torsion of guide wheel and rotor blades enables the pressure curves imprinted on the flow at different axial distances by the blades to be largely unified. For example, in FIG. 15 this would mean that pressure curves I and III and/or II and IV would be more closely approximated. This results in a widening of the permissible pressure range. In FIG. 15 the upper limit pressure $(p_W/p_1)_{max}$ shifts upward with curve IV, and the lower limit pressure $(p_W/p_1)_{min}$ downward with curve I. The degree of necessary torsion depends inter alia on the ratio of blade length to middle circle diameter and increases with a greater ratio. The sense of the torsion must be such that in the outside portion of the flow channel, the guide wheel blades in a circumferential direction are twisted more internally than externally and thereby have an exit blade angle which is smaller externally than internally whereas the rotor blades in a circumferential direction are twisted more externally than near the hub and thereby have an exit blade angle which is greater externally than internally. Such blade torsion will be incorporated more in the stages which come into operation for vaporization purposes and perhaps in the stage before that, because such twisted stages generally have an inferior flow efficiency to those usually used.

The above mentioned shortening of blade length in the wheel in which vaporization occurs brings apart from the above mentioned advantages also the further one that from hub to tip smaller divergences occur, or that to balance them less blade torsion is needed.

After these examples of scope for improvements by increasing pressure drop speed and extension of permissible pressure range, a further opening for improvement is now mentioned. This is connected with non-steady disturbances of vaporization.

In the steam current flowing through a blade wheel, those strata passing near the walls (blades, rotator and housing wall) are strongly braked by friction and thus heated. In the axial space after the blade wheel the actual "healthy" or steady flow is interspersed with warmer, slower flowing strata which flow off from every blade producing irregularities or so-called dents or dips and mix only gradually with the other flow. This balance is not by a long way completed at the point of input into the next blade wheel. As the two blade wheels rotate relative to each other, alternately colder and warmer steam enters each blade channel of the following wheel. The warmer steam occurs naturally relatively briefly, because the thickness of the dips is small in comparison to the blade spacing. The consequences of this phenomenon are explained with reference to FIG. 24 which represents the condition curve in two blade wheels in the enthalpy entropy diagram. Point $A_1$ gives the input condition at the first wheel, in which the steam is expanded from pressure $p_1$ to pressure $p_2$. At the output from this wheel the healthy flow has the temperature $T_2$ at condition point $A_2$; in the dip, on the other hand, there is a higher temperature $T'_2$ at condition point $A'_2$. In the second wheel there now occur alternately steam of condition $A_2$ and condition $A'_2$, which leads to the condition at the output from the second wheel corresponding to point $A_3$, and, with reference to the dips, to point $A'_3$. If this second wheel is the one in which in the healthy flow the Wilson condition is reached i.e., the point of intersection W with Wilson line $w$, it is also possible that the Wilson condition will not be reached at all in this blade wheel due to the steam originating from the dips.

The dips of the previous blade wheel therefore lead to oscillation of the Wilson point and deteriorate in general the uniform quality of the vapour. The elimination or at least the reduction of this influence is therefore desirable and can be achieved by the following means.

*Shift of the Wilson condition to the first blade wheel of a turbine housing.*—By this means completely stationary behaviour of vaporization can be achieved, at least at large loads, i.e. when the Wilson condition is actually retained in this wheel. Such turbines are shown in FIGS. 16 and 23.

*Reduction of number of blades.*—That is, greater spacing-to-chord ratio in the previous blade wheel. The dips then remain equally thick, but are less numerous, which reduces the frequency of disturbances. For example, for the turbine shown in FIG. 20 this would mean that the blade spacing in rotor 116 is greater than in guide wheel 115, which has the same blade profiles, e.g., 1.2 times as large. A limit for the still permissible enlargement of spacing is set by the fact that in no case may there be a separation of flow from the blades.

*Wide axial space* before the blade wheel in which the Wilson condition occurs: thus the wider spring permits the irregularities produced by the previous wheel to better mix with the healthy or steady flow before the input to this wheel, and which thereby reduces the oscillation of the Wilson point. As exemplary designs FIGS. 19, 20 and 22 are cited. Before blade wheels 81 and/or 91 and/or 103 the axial space is wider, e.g., at least one and one half times wider than the axial spaces in the adjacent stages. In addition the axial spaces before rotor 92 and guide wheel 93 in FIG. 20 could also have been widened so as to improve the ratios at partial loads.

As in the dips or irregular flow, the Wilson condition is reached also in the wall limit strata (at housing and hub) only at a lower pressure than in the healthy flow. This is a stationary phenomenon, because the wall limit stratum occurs over the entire circumference. Suitable actions which can release vaporization also near the wall in the same blade wheel as in the core of the flow are e.g. the constriction of the flow in the way shown in FIG. 19 i.e., the protruding portions 86 and 87, which produces greater expansion locally near the wall, or by the removal of the wall limit stratum before the blade wheel through a suction effect produced by a space or slot such as the slot 121 in FIG. 25, whereby the removed steam can be used e.g. in the conventional manner for preheating the feed water.

Of the many ways for improving a blade wheel with regard to vaporization several can also be applied at once and FIGS. 25 and 26 are cited as such examples.

In the turbine partially shown in FIG. 25 vaporization occurs at full load in guide wheel 117 of the third stage shown in the drawing. This guide wheel has the following characteristics favourable for vaporization: small axial width of stages, large axial steam speed produced by protruding rings 118 and 119, large axial distance from previous blade wheel 120, removal of wall limit strata at the outer wall by means of slot 121, ring space 122 and bleeding hole 123, and at the inner wall by means of gap 124, through which, despite the labyrinth strips 125, a certain quantity of steam passes, great pressure drop since this stage is dimensioned as an action stage and variation of blade angle along the channel height by the portion of the guide wheel 117 lying outside the support ring 126 having smaller output angles than the inside part. It is to be noted that the guide wheel 117 with the appropriate rings 118 and 119 is made as a unit separate from housing 127. To regulate vaporization at load changes, the subsequent stage in the present example is equipped with adjustable guiding blades 128 which are controlled as described with reference to FIG. 14. These blades are held e.g. in the known manner in radial holes 129 of housing 127 by means of bearing 130 and with the aid of levers 132 may be turned round their axis 121. By adjusting blades 128 the pressures can be changed before guide wheel 117 so that the Wilson pressure remains in guide wheel 117 even at partial loads.

FIG. 26 shows as second example the input portion of the low pressure housing of a turbine. The first stage in this housing is designed in the manner of the so-called centripetal turbine so as to improve its pressure gradient, and consists of the guide wheel 300, which has radial flow-through, and rotor 301, with semi-axial flow-through. Vaporization occurs at full load in guide wheel 300. This guide wheel is fastened in housing portions 302 and 303. The blade channels of the rotor are limited outside by a cover plate 304 and inside by the protruding portion 305 of rotator 306. The rest of the turbine is conventionally designed and consists of conventional axial stages, of which only the first is shown in the illustration (guide wheel 307 and rotor 308). At the output from guide wheel 300, due to the great circumferential speed of rotor 301, a materially greater absolute steam speed and Mach number can be permitted than at the output from guide wheels of the type of guide wheel 307. In FIG. 26b, the axial view of guide wheel 300 and of rotor 301 is shown, housing portion 303 and cover plate 304 being omitted. Guide wheel 300 has the following properties favourable to vaporization: great pressure gradient, great flow-through speed of steam and small wheel width. Further, there is no variation of condition curve along its blades, so that blade torsion is unnecessary from the start. There is also no periodical disturbance of vaporization through the dips of the previous wheel. In connection with this illustration, it is noted that in the case of a blade wheel which has radial flow-through, such as blade wheel 300, the *radial*, not the axial wheel width and the *radial* flow-through speed are the determining factors.

In connection with the design of the condensation wheel reference is made in the description to comparable values of geometrical or flow hydraulics at neighbouring blade wheels of the same turbine housing, or also at a blade wheel usually present instead of the condensation wheel and is termed a comparable wheel. Such a blade wheel, as against which the divergent values of the condenser wheel are described as material, is intended as a wheel for comparison. It can be seen that as a comparative wheel in those cases a neighbouring wheel (of the same turbine housing) can be chosen in which the individual stages of the housing do not differ materially from each other. In contradistinction, if from stage to stage greater differences occur in relation to the shaping or to the gradient of the individual stages, the data of the comparative wheel will be calculated by extrapolation or intrapolation from the neighbouring conventionally designed blade wheels. It is self-evident that in general only guide wheels may be compared with each other, or rotors with each other.

What is claimed is:

1. A method for utilizing heat power in a thermal power plant using a condensable vapor as the working medium and comprising at least one turbine the load or other operating conditions of which are variable and which turbine has at least one inlet for the working medium at which inlet the working medium is in a superheated or saturated or wet vapor state and which turbine comprises at least one stator blade wheel and at least one rotor blade wheel and interspaces separating said blade wheels, the working medium in said turbine being expanded to such a low pressure that its vapor component reaches supersaturated conditions and part of said vapor component is transformed into liquid, which liquid is distributed throughout the vapor in form of small droplets called fog droplets, the formation of said fog having a point of inception the position of which with respect to said blade wheels and said interspaces is influenced by the load and other operating conditions of the turbine in a manner that it lies in one of the blade wheels under some conditions and in one of the interspaces under other conditions, said power plant being equipped at least for regulation of the load or for other regulation, the method comprising the steps of:
   (a) measuring at least one property of the working medium during the operation of the turbine at at least one point in said turbine;
   (b) using the result of said measurements to form a regulating impulse; and
   (c) performing a regulating action in addition to said load regulation or other regulation on the basis of said regulating impulse, by which regulating action the point of inception of the fog formation is kept within a preselected blade wheel even in case the load or other operating conditions of the turbine are being varied.

2. The method as defined in claim 1 wherein step (b) includes the determination of the deviation of at least one property of the vapor from a preselected value of this property, said deviation of said property being indicative of a shifting of the point of inception of the fog formation with respect to said preselected blade wheel.

3. The method as defined in claim 2 wherein the turbine has at least one inlet at which the working medium is in a state which is superheated with respect to the saturation conditions and wherein step (a) includes the measurement of at least two properties of the medium at points where when the turbine is operating at full rated load, the medium is in a superheated state.

4. The method as defined in claim 3 wherein said at least two properties of the medium are measured at points located in a stator blade wheel or in the interspace ahead of a stator blade wheel.

5. The method as defined in claim 3 wherein step (a) further includes the measurement of at least one property of the medium in said preselected blade wheel or in the interspace ahead thereof.

6. The method as defined in claim 1 wherein step (a) includes the measuring of the said at least one property of the medium in at least two places within the turbine, said at least one property being indicative of the presence of fog droplets within the medium, and one of said places being upstream of and the other downstream of said preselected blade wheel, and step (b) includes the comparing of the values measured at said places.

7. The method as defined in claim 6 wherein said at least one property includes the scattering or attenuation of a beam which scattering or attenuation is caused by the medium.

8. The method as defined in claim 7 wherein said beam is a light beam.

9. The method as defined in claim 5 wherein said at least one property includes the temperature assumed by a temperature sensor exposed to the medium.

10. The method as defined in claim 1 wherein step (a) includes the measurement of at least one property of the medium which is indicative of the average size of the fog droplets contained in the medium, said measurement being made downstream of said preselected blade wheel and step (b) includes the determining of the deviation of the mean size of the droplets from a predetermined acceptable maximum size.

11. The method as defined in claim 10 wherein said at least one property includes the degree of light beam scattering caused by the fog.

12. An arrangement for utilizing heat power in a thermal power plant having a condensible vapor as the working medium comprising at least one turbine the load of which is variable and in which the working medium is expanded to such a low pressure that a part thereof is transformed from the vapor form into liquid form as a result of fog formation, said turbine comprising at least two blade wheels of the stator type and at least two blade wheels of the rotor type arranged in series, said fog formation having a point of inception lying at full load in one of said blade wheels called condensation blade wheel, the arrangement being such that said condensation blade wheel has a value of $\bar{P}$ at least twice as large as that of any one of the two blade wheels of the same type next to which said condensation blade wheel is located, wherein $\bar{P}$ is the mean rate of pressure decrease in a blade wheel, $\bar{P}$ being expressed by the relationship:

$$\bar{P} = \left(\frac{C_a}{P_1}\right)\left(\frac{P_1 - P_2}{\Delta \xi}\right)$$

wherein $C_a$ is the axial component of the stream speed;
$P_1$ is the static pressure at inlet to the blade wheel;
$P_2$ is the static pressure at exit from the blade wheel; and
$\Delta \xi$ is the axial width of the part of the blade wheel in which the deflection of the flow is effected.

13. An arrangement as defined in claim 12 wherein said power plant is equipped at least for regulation of the turbine load or for other regulation, the arrangement including, in combination,
    (a) means for measuring at least one property of the working medium flowing through said turbine;
    (b) means for forming a regulating impulse on the basis of said measurements; and
    (c) means responsive to said regulating impulse for performing a regulating action in addition to said turbine load or other regulation, by which regulating action the point of inception of the fog formation is kept within said condensation blade wheel even in case the turbine load or other operating conditions of the turbine are varied.

14. An arrangement as defined in claim 12 wherein a plurality of said blade wheels including the condensation blade wheel are of the axial kind and the axial width of said condensation blade wheel is smaller than the axial width of any of the two blade wheels of the same type next to which said condensation blade wheel is located.

15. An arrangement as defined in claim 14 wherein said turbine has a housing and said condensation blade wheel includes a ring secured to the inner ends of the blades of said condensation wheel and spokes secured to said ring for connecting said ring to the housing of the turbine.

16. An arrangement as defined in claim 15 wherein at least one intermediate ring is provided between said ring and said housing for fastening said blades and connecting them to said spokes.

17. An arrangement as defined in claim 16 wherein said condensation blade wheel is divided by said at least one intermediate ring into at least two concentric rows of blades which rows are separated from one another.

18. An arrangement as defined in claim 17 wherein said concentric rows of blades have different numbers of blades.

19. An arrangement as defined in claim 17 wherein said concentric rows of blades have different exit flow angles.

20. An arrangement as defined in claim 12 wherein said condensation blade wheel is provided with a plurality of blade channels, said channels comprising a long entry portion in which the flow is approximately straight and an adjoining short exit portion in which the flow is being deflected.

21. An arrangement as defined in claim 12 wherein each of said blade wheels comprises a plurality of blade channels and wherein the flow cross-sectional area provided by the blade channels of said condensation wheel is smaller than that provided by the blade channels of any of the two blade wheels of the same type lying next to said condensation blade wheel.

22. An arrangement as defined in claim 21 wherein the length of the blades in said condensation blade wheel is less than in any of the two blade wheels of the same type lying next to said condensation wheel.

23. An arrangement as defined in claim 12 wherein the pressure drop in said condensation blade wheel is greater than the pressure drop in any of the two stator blade wheels lying next to said condensation blade wheel and the pressure drop is expressed by the relationship:

$$\frac{P_1 - P_2}{P_1}$$

24. An arrangement as defined in claim 23 wherein said turbine comprises a plurality of turbine stages of the reaction type and at least one stage of the impulse type and wherein the condensation blade wheel is the stator blade wheel of a turbine stage of the impulse type.

25. An arrangement as defined in claim 23 wherein said turbine comprises a plurality of turbine stages of the reaction or of the impulse type and at least one stage of the Curtis type and wherein the condensation blade wheel is the stator blade wheel of a turbine stage of the Curtis type.

26. An arrangement as defined in claim 23 wherein said turbine comprises a plurality of axial turbine stages and at least one centripetal turbine stage and wherein the condensation blade wheel is the stator blade wheel of a stage of the centripetal type.

References Cited

UNITED STATES PATENTS

| | | | |
|---|---|---|---|
| 1,648,343 | 11/1927 | Hartmann | 60—105 |
| 2,042,838 | 6/1936 | Gibson | 60—106 |
| 2,106,346 | 1/1938 | Gleichmann | 60—106 |
| 2,200,471 | 5/1940 | Dickey | 60—105 X |
| 2,408,445 | 10/1946 | Pearson | 60—105 X |
| 2,962,865 | 12/1960 | Buri | 60—105 |
| 3,089,308 | 5/1963 | Halle | 60—106 |
| 3,172,266 | 3/1965 | Strohmeyer | 60—105 |

MARTIN P. SCHWADRON, *Primary Examiner.*

ROBERT R. BUNEVICH, *Examiner.*